(12) United States Patent
Yoshida et al.

(10) Patent No.: US 7,801,015 B2
(45) Date of Patent: Sep. 21, 2010

(54) OPTICAL RECORDING MEDIUM HAVING PHYSICAL AND LOGICAL POSITION INFORMATION OF BUFFER AREAS

(75) Inventors: Masayoshi Yoshida, Tokorozawa (JP); Keiji Katata, Tokorozawa (JP); Takeshi Koda, Tokorozawa (JP); Shoji Taniguchi, Tokorozawa (JP); Eiji Muramatsu, Tokorozawa (JP); Masahiro Kato, Tokorozawa (JP); Masahiro Miura, Tokorozawa (JP); Tsuyoshi Hasebe, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 152 days.

(21) Appl. No.: 12/278,628

(22) PCT Filed: Feb. 8, 2007

(86) PCT No.: PCT/JP2007/052176

§ 371 (c)(1),
(2), (4) Date: Aug. 7, 2008

(87) PCT Pub. No.: WO2007/091620

PCT Pub. Date: Aug. 16, 2007

(65) Prior Publication Data

US 2009/0040914 A1   Feb. 12, 2009

(30) Foreign Application Priority Data

Feb. 10, 2006  (JP) .............................. 2006-033863

(51) Int. Cl.
*G11B 7/24* (2006.01)
(52) U.S. Cl. ................................. 369/275.3; 369/275.1
(58) Field of Classification Search .............. 369/275.3, 369/275.1, 275.2, 275.4
See application file for complete search history.

(56) References Cited

U.S. PATENT DOCUMENTS

| 7,529,159 B2 * | 5/2009 | Koda et al. ................. 369/30.1 |
| 7,602,683 B2 * | 10/2009 | Katata et al. ............. 369/47.53 |
| 2005/0063295 A1 | 3/2005 | Muramatsu et al. |
| 2008/0250188 A1 * | 10/2008 | Nakanishi et al. .............. 711/1 |

FOREIGN PATENT DOCUMENTS

| JP | 2001-23237 | 1/2001 |
| JP | 2000-311346 | 11/2005 |
| WO | WO 2005/086162 | 9/2005 |

* cited by examiner

*Primary Examiner*—Tan X Dinh
(74) *Attorney, Agent, or Firm*—Young & Thompson

(57) ABSTRACT

An optical disk (100) comprises recording management areas (103, 113) in which record management data for managing data recording is recorded. The record management data includes (i) physical position information (122, 125, 126) indicating the positions of physical buffer areas in which buffer data for buffering recording operation is physically recorded and (ii) logical position information (121) indicating the position of a logical buffer area in which buffer data is logically recorded or to be recorded.

16 Claims, 22 Drawing Sheets

[FIG. 2]
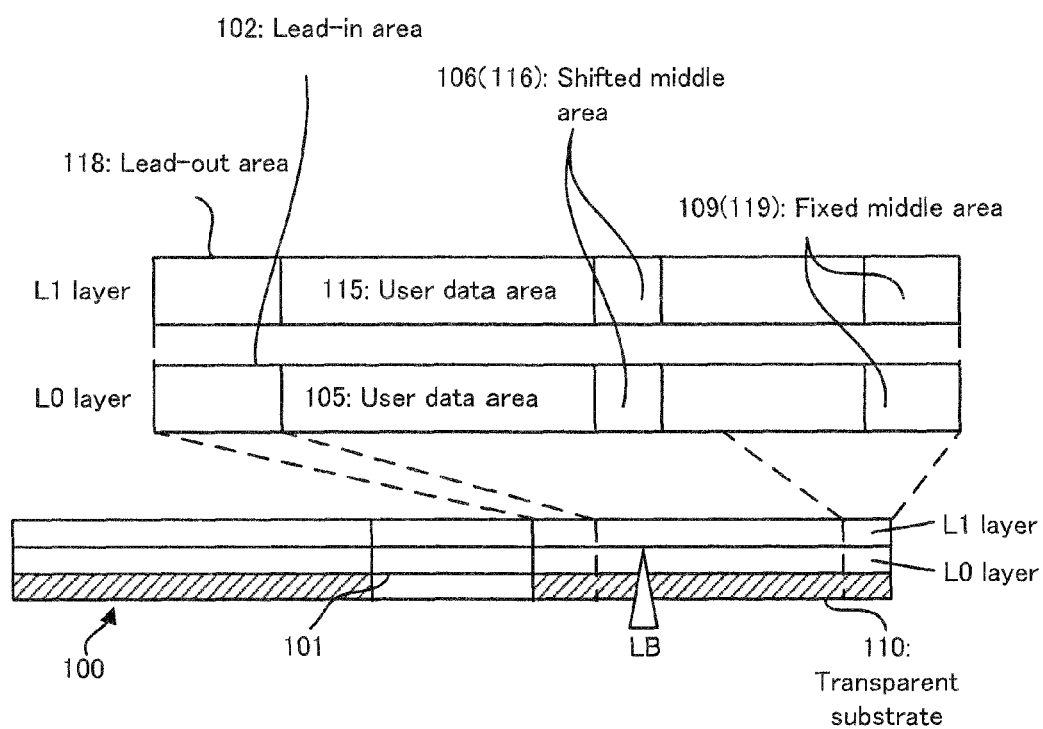

[FIG. 3]
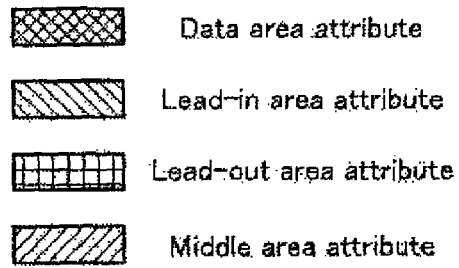
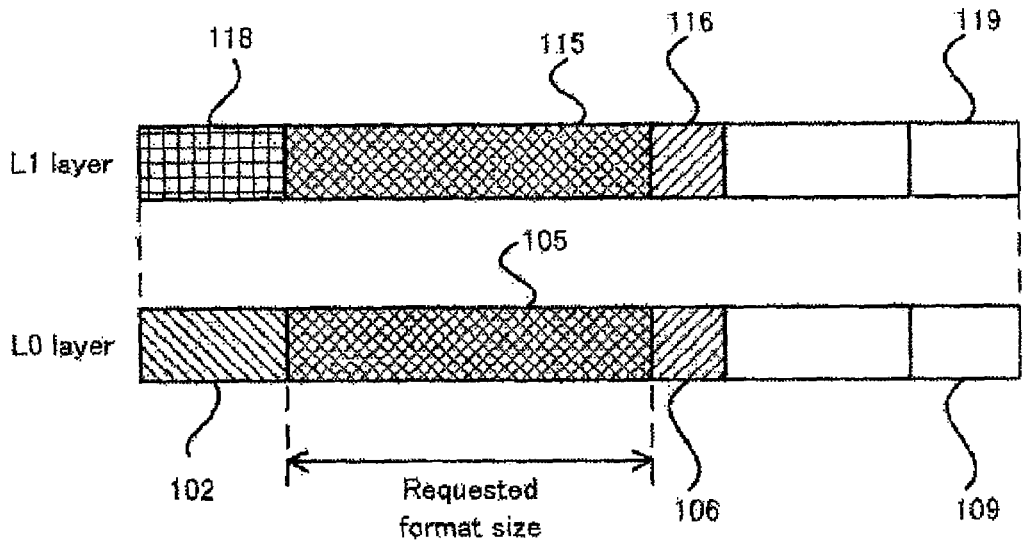
Figure 3A
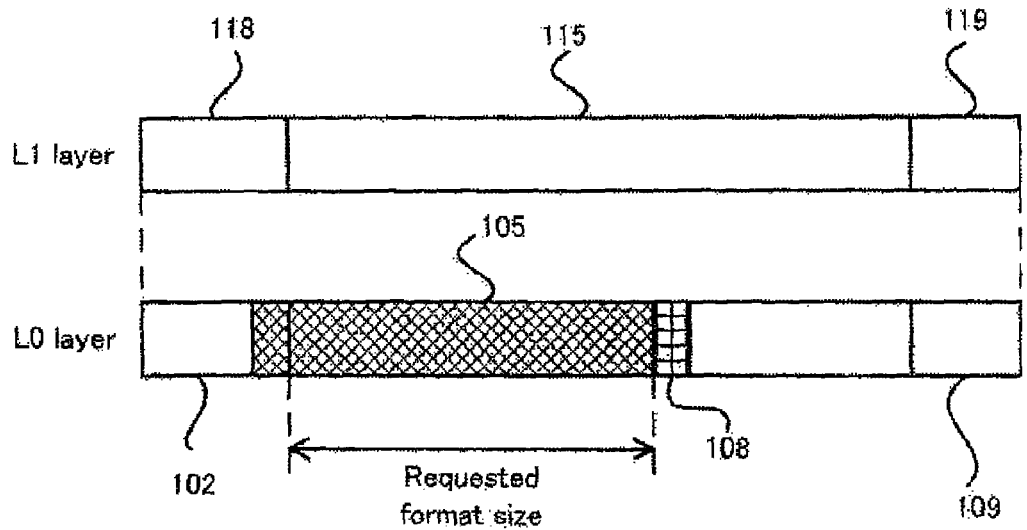
Figure 3B

[FIG. 4]
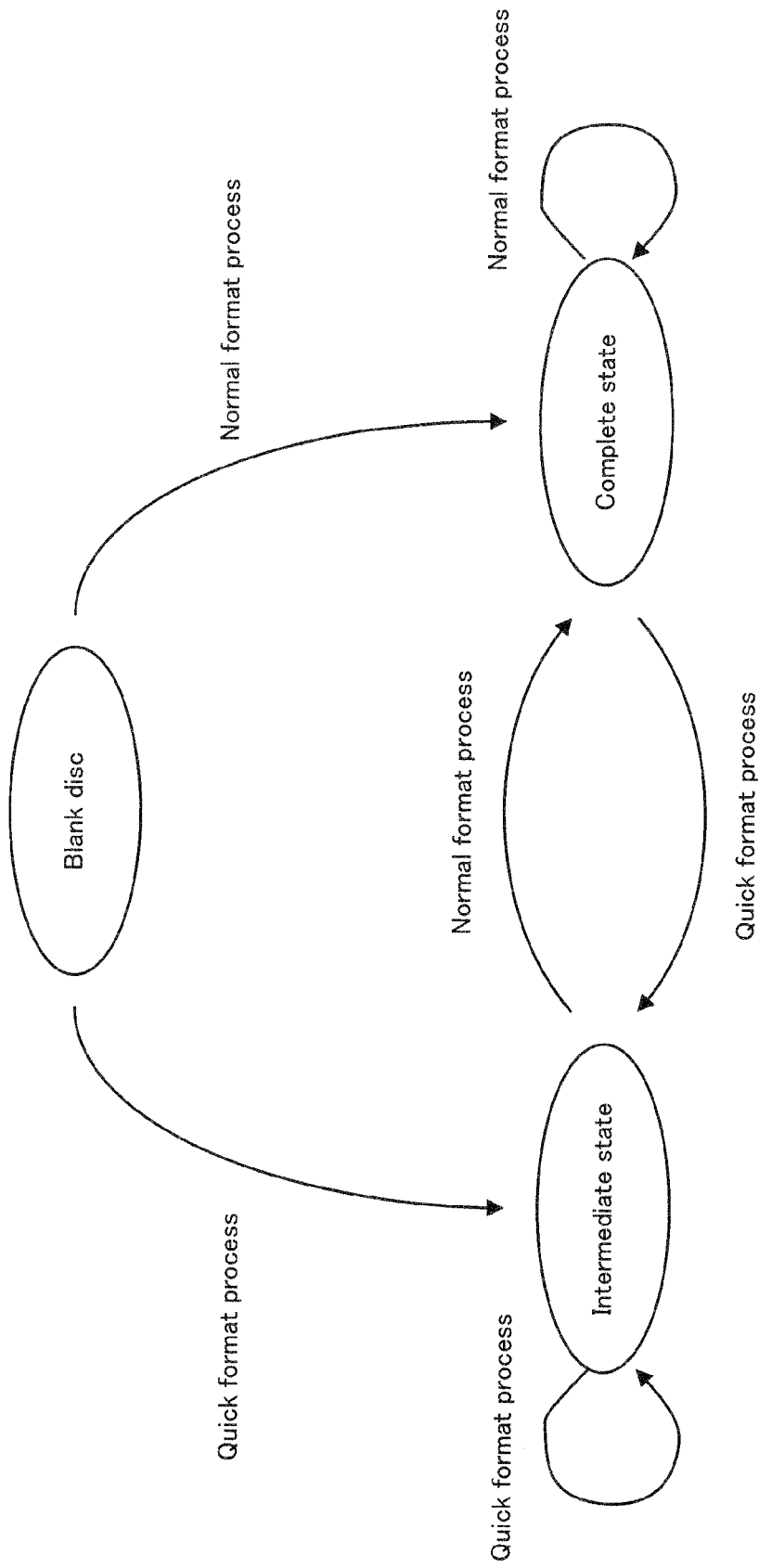

[FIG. 5]
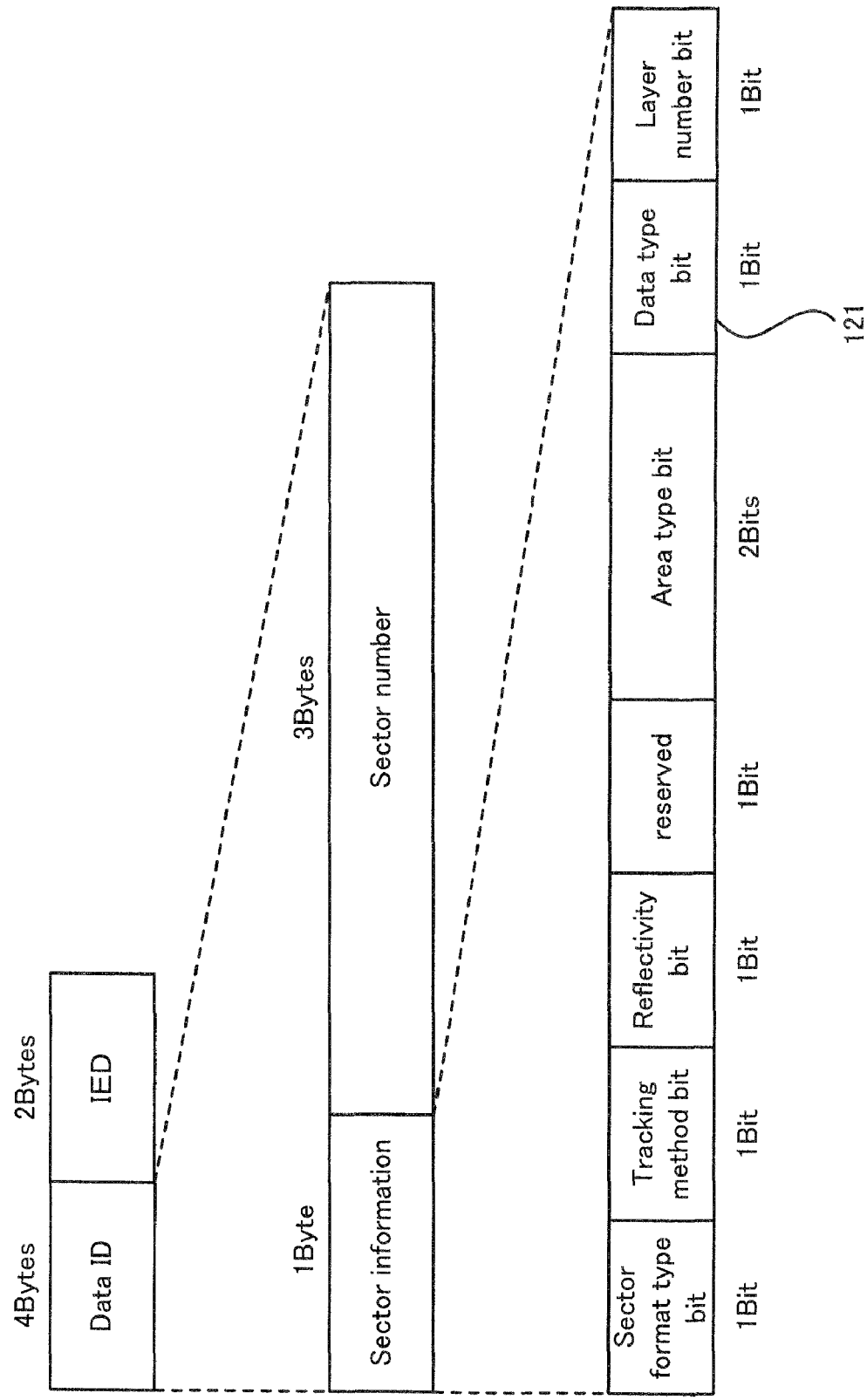

[FIG. 6]
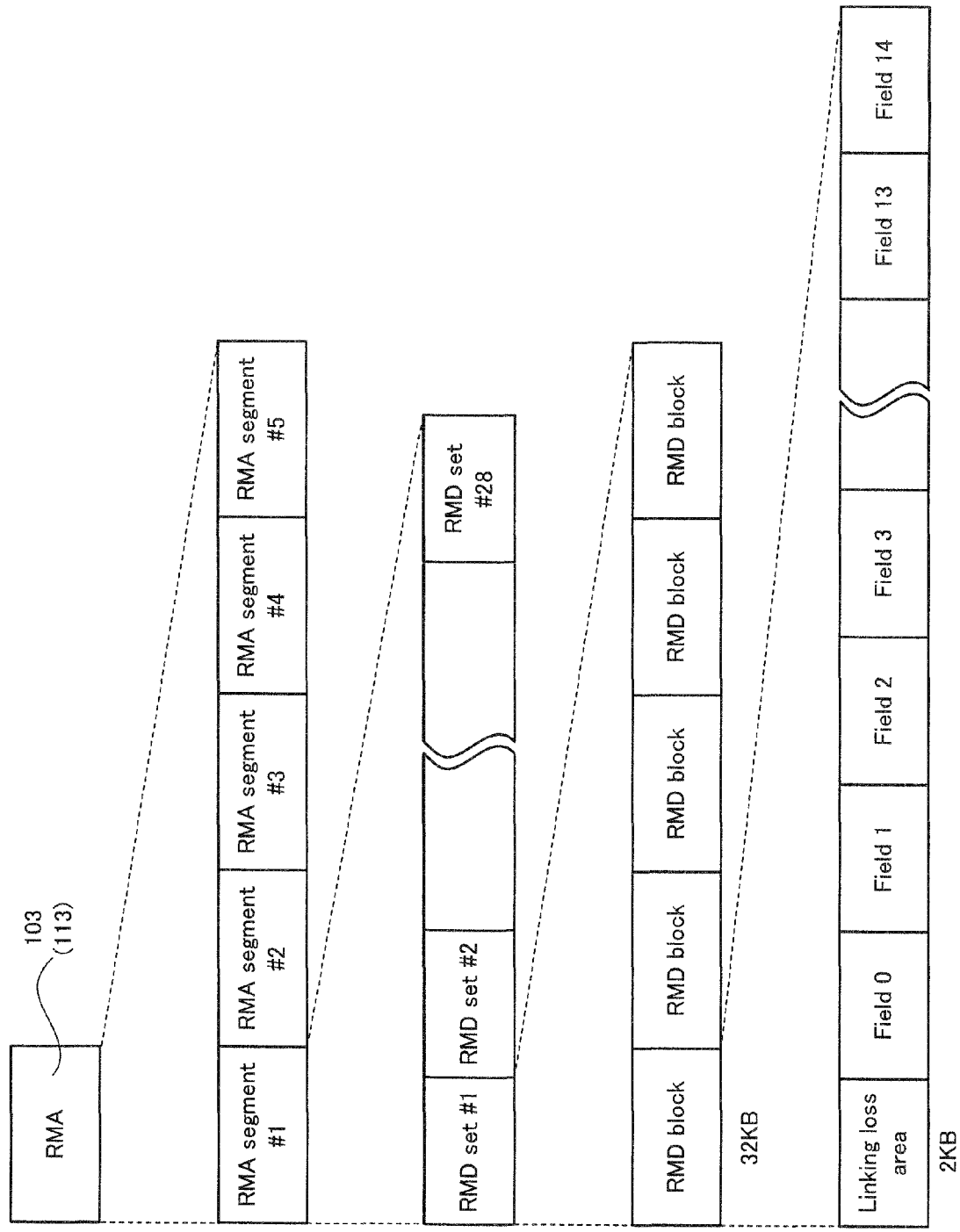

[FIG. 7]

| Sector number | Field number | Format 2 RMD | Format 3 RMD |
|---|---|---|---|
| 0 | Linking loss area | Linking loss area | |
| 1 | 0 | Common information | |
| 2 | 1 | Pointer to RMD set | OPC related information |
| 3 | 2 | | User specific data |
| 4 | 3 | | Recording status information |
| 5 | 4 | | |
| 6 | 5 | | |
| 7 | 6 | | |
| 8 | 7 | | |
| 9 | 8 | Reserved area | Defect status bitmap |
| 10 | 9 | | |
| 11 | 10 | | |
| 12 | 11 | | |
| 13 | 12 | | |
| 14 | 13 | | Drive specific information |
| 15 | 14 | | Disc testing area information |

[FIG. 8]

| BP | Content | | Number of bytes | |
|---|---|---|---|---|
| 0 to 1 | RMD format | | 2bytes | |
| 2 | Disc status | | 1byte | |
| 3 | Reserved | | 1byte | |
| 4 to 21 | Unique disc ID | | 18bytes | |
| 22 to 85 | Copy of pre-pit information | | 64bytes | |
| 86 to 89 | Start sector number of shifted middle area | | 4bytes | |
| 90 | Pre-recorded /embossed information code | ... | 1byte | ... |
| | | Physical shifted middle area recorded flag | | 1 bit |
| | | ... | | ... |
| 91 | Reserved | | 1byte | |
| 92 to 95 | End address of pre-recorded/embossed lead-in area | | 4bytes | |
| 96 to 99 | End address of pre-recorded/embossed middle area (L0layer) | | 4bytes | |
| 100 to 103 | Start address of pre-recorded/embossed middle are (L1layer) | | 4bytes | |
| 104 to 107 | Start address of pre-recorded/embossed lead-out area | | 4bytes | |
| 108 to 127 | Reserved | | 20bytes | |
| 128 | RBG information | | 1byte | |
| 129 to 2047 | Reserved | | 1919bytes | |

| BP | Content | Number of bytes |
|---|---|---|
| 0 | Format operation code | 1byte |
| 1 | Reserved | 1byte |
| 2 to 5 | Format information #1 | 4bytes |
| 6 to 9 | Format information #2 | 4bytes |
| 10 to 255 | Reserved | 54bytes |
| 256 to 257 | Last Rzone number | 2bytes |
| 258 to 261 | Start sector number of RZone | 4bytes |
| 262 to 265 | End sector number of RZone | 4bytes |
| 266 to 511 | Reserved | 4bytes |
| 512 to 515 | Layer jump address on L0 layer | 4bytes |
| 516 to 519 | Last recorded address | 4bytes |
| 520 to 523 | Previous layer jump address on L0 layer | 4bytes |
| 524 to 525 | Jump interval | 2bytes |
| 526 to 527 | Reserved | 2bytes |
| 528 to 531 | Outermost address of formatted area on L0 layer | 4bytes |
| 532 to 535 | Outermost address of innermost formatted area on L1 layer | 4bytes |
| 536 to 539 | Outermost address of innermost recorded area on L1 layer | 4bytes |
| 540 to 2047 | Reserved | 1508bytes |

[FIG. 10]

[FIG. 11]
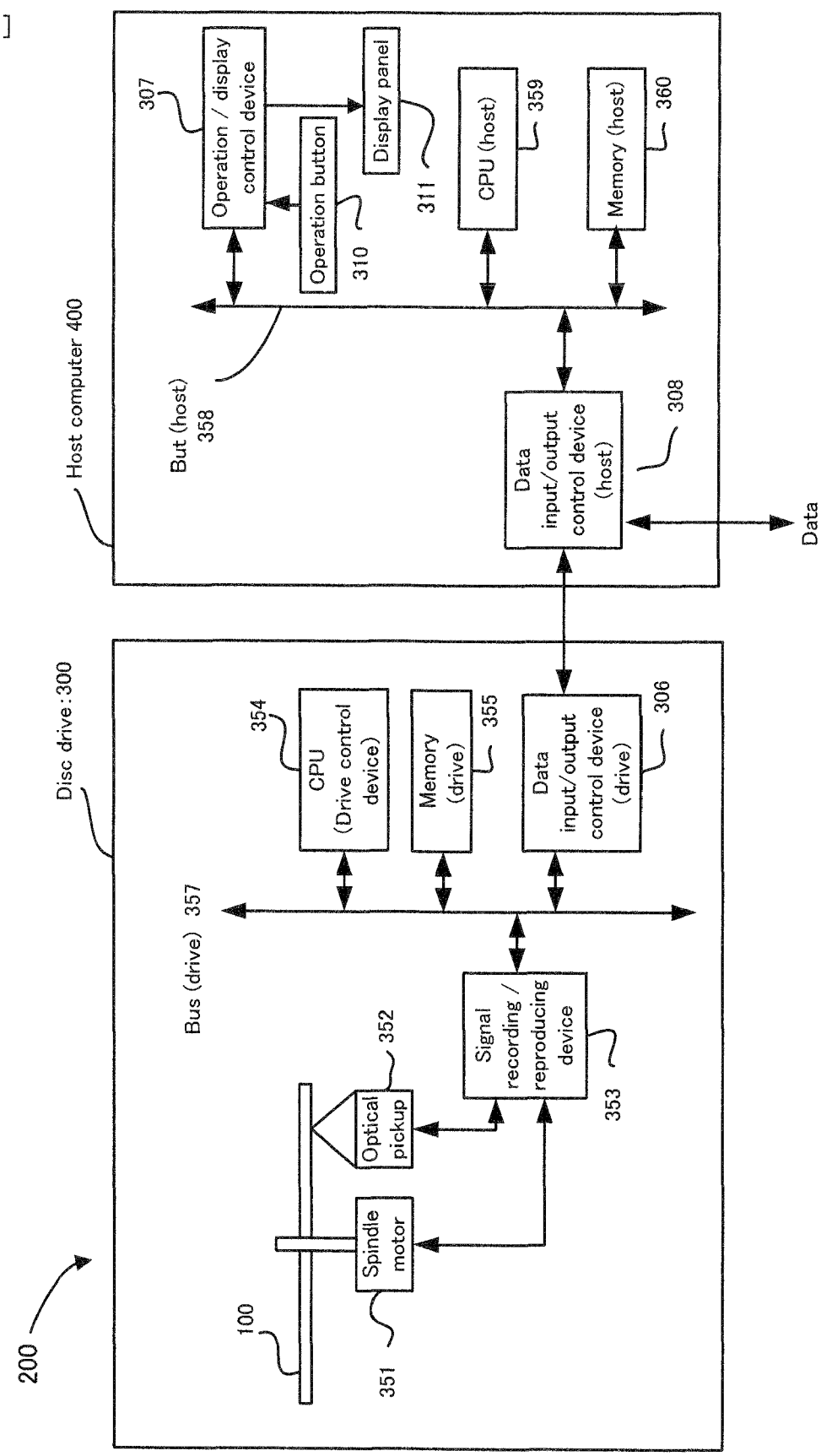

[FIG. 19]
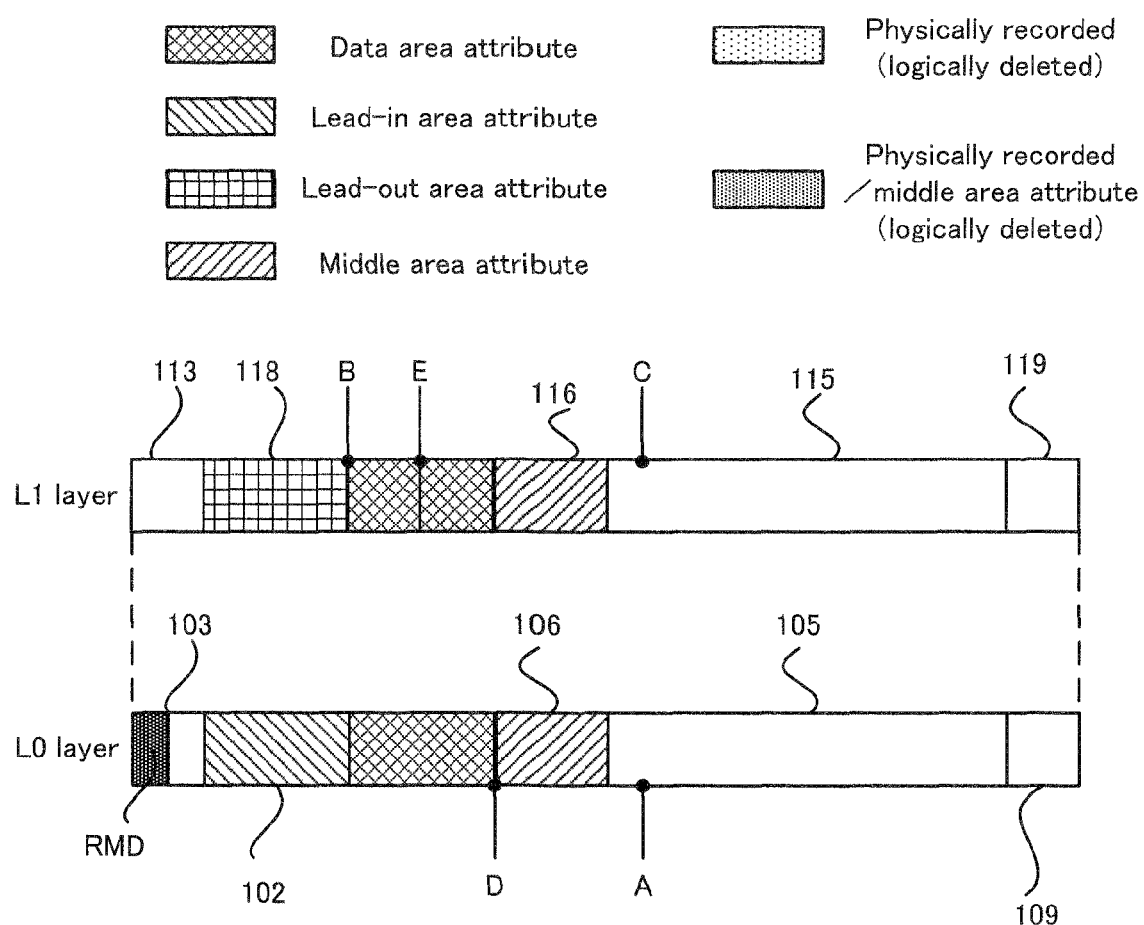

[FIG. 21]

OPTICAL RECORDING MEDIUM HAVING PHYSICAL AND LOGICAL POSITION INFORMATION OF BUFFER AREAS

TECHNICAL FIELD

The present invention relates to an information recording medium, such as a DVD (Digital Versatile Disc), an information recording apparatus and an information recording method, such as a DVD recorder, and a computer program which makes a computer function as such an information recording apparatus.

BACKGROUND ART

In an information recording medium, such as a DVD-ROM (DVD-Read Only Memory), a DVD-R (DVD-Recordable), and a BD-ROM (Blu-ray Disc-ROM), for example, as described in patent documents 1, and 2, etc., there is also developed an information recording medium, such as an optical disc, of a multilayer type or dual layer type, in which a plurality of recording layers are laminated or stacked on the same substrate. Then, if recording is performed with respect to a DVD-R of the dual layer type, i.e., of a two-layer type, out of the two-layer type optical disc, an information recording apparatus, such as a DVD recorder, focuses laser light for recording on a recording layer located on the front (i.e. on the closer side to an optical pickup) viewed from a laser light irradiation side (hereinafter referred to as an "L0, layer", as occasion demands), to thereby record information into the L0 layer in a heat change recording method (in other words, an irreversible change recording method. Moreover, it focuses the laser light for recording on a recording layer located on the rear (i.e. on the farther side to the optical pickup) viewed from the laser light irradiation side (hereinafter referred to as an "L1 layer", as occasion demands), through the L0 layer, to thereby record information into the L1 layer in the heat change recording method.

Patent document 1: Japanese Patent Application Laid Open NO. 2000-311346
Patent document 2: Japanese Patent Application Laid Open NO. 2001-23237

DISCLOSURE OF INVENTION

Subject to be Solved by the Invention

With regard to such a two-layer type optical disc, a rewritable optical disc, such as a DVD-RW, is being developed. On the rewritable optical disc, a format process to make it in a data recordable condition is performed. Into an area set to be recorded by the format process, another data can be randomly overwritten. In a normal format process (normal format), a lead-in area and a lead-out area are formed, and a middle area is formed following the recorded data. By this, it is possible to substantially equalize the data structure of the rewritable optical disc, such as a DVD-RW, and the data structure of a read-only optical disc, such as a DVD-ROM.

On the other hand, for example, in the DVD-RW, a quick format process in which minimum necessary management information is recorded is defined. On the DVD-RW on which the quick format process is performed, it is possible to perform sequential recording from the end edge portion of the recorded area. It is also possible to randomly overwrite another data in an area which is already sequential-recorded and set to be recorded, in the same manner.

Moreover, as a general rule, the recording area in which the data is once recorded or in which the format process is once performed will never return to an unrecorded recording area in which data is not recorded (in other words, a record mark is not recorded). In the quick format, a format processing time can be greatly reduced by recording the minimum necessary management information. However, only one portion of the lead-in is recorded, and an area corresponding to the lead-out is not recorded, so that a read-only apparatus cannot read it. Therefore, in order to perform the reading by using the read-only apparatus, a finalize process described later (in other words, a compatibility process or close process) is required.

In the recording media, such as CDs and DVDs, it is necessary to construct the recording state such that the information on the disc can be reproduced by the read-only apparatus in response to a user's request. For example, in a disc on which information can be written once, such as a CD-R and a DVD-R, the finalize process is defined to make the disc reproducible by the read-only apparatus, and it is designed to form a buffer area, such as a lead-in area, a lead-out area, a middle area, a border-in area, and a border-out area, in order not to leave the unrecorded area in a range that the read-only apparatus accesses in response to the user's request. This is because there is such a problem that the read-only apparatus cannot access the unrecorded portion of the recording media, due to different tracking methods of signals between a read-only medium and a recordable medium, in the case of CDs and DVDs.

However, the buffer area that is once formed by the finalize process is logically deleted by the format process. Thus, if the finalize process is performed again, it is necessary to form the buffer area again. On the other hand, even if the buffer area is logically deleted by the format process, the buffer area physically remains on the information recording medium. Thus, the finalize process may cause the redundant formation of the buffer area, so that it is far from an efficient operation.

It is therefore an object of the present invention to provide an information recording medium which enables a buffer area to be efficiently formed, an information recording apparatus and an information recording method, and a computer program which makes a computer function as such an information recording apparatus.

Means for Solving the Subject (Information Recording Medium)

The above object of the present invention can be achieved by an information recording medium on which data can be rewritten, provided with a recording management area (e.g. RMA described later) in which recording management data (e.g. RMD described later) for managing recording of the data on the information recording medium is recorded, the recording management data including: (i) physical position information indicating a position of a physical buffer area in which buffer data for buffering a recording operation is physically recorded as the data and (ii) logical position information indicating a position of a logical buffer area in which the buffer data is logically recorded or to be recorded as the data.

According to the information recording medium of the present invention, along with the data recording, the recording management data is recorded into the recording management area. The recording management data includes the physical position information and the logical position information.

The physical position information indicates the position of the physical buffer area (e.g. a lead-in area, a lead-out area, a middle area, a border-in area, a border-out area, etc.) in which the buffer data for buffering the recording operation is recorded physically (i.e. recorded as an actual record pit and an actual record mark). At this time, the physical buffer area may be deleted logically (i.e. deleted on the basis of the recording management data) on the information recording medium.

On the other hand, the logical position information indicates the position of the logical buffer area (e.g. a lead-in area, a lead-out area, a middle area, a border-in area, a border-out area, etc.) in which the buffer data for buffering the recording operation is recorded or to be recorded logically. At this time, the buffer data does not have to be physically recorded into the logical buffer area. It is only necessary that the logical buffer area exists or will exist in the future on the information recording medium. The logical buffer area is disposed to be adjacent to the end edge portion of the data recorded by a user.

As described above, according to the information recording medium of the present invention, the recording management data including both the physical position information and the logical position information is recorded. Thus, even if the physical buffer area which is once physically formed by a compatibility process, for example, is logically deleted by a format process or the like, an information recording apparatus can still preferably recognize the position of the physical buffer area. Thus, even if the logical buffer area is formed along with the data recording, as long as the physical buffer area is not physically deleted, the compatibility process can be completed by using the physical buffer area, without newly and physically recording the buffer data into the logical buffer area. On the other hand, if the physical buffer area is physically deleted along with the data recording by the user, the compatibility process can be completed by newly and physically recording the buffer data into the logical buffer area. As described above, according to the present invention, it is possible to relatively reduce a time length required for the compatibility process. In other words, it is possible to select whether or not to newly and physically record the buffer data, as occasion demands. Thus, it is possible to efficiently form the buffer area.

In one aspect of the information recording medium of the present invention, the physical position information includes a flag (e.g. physical shifted middle area recorded flag, described later) indicating whether or not the physical buffer area is formed on the information recording medium.

According to this aspect, it is possible to preferably receive the above-mentioned various benefits by recording such flag.

In another aspect of the information recording medium of the present invention, the physical position information includes an address of an edge portion on an outermost circumferential side of a recording area (e.g. an outermost address of a formatted area on a L0 layer and an outermost address of an innermost formatted area on a L1 layer, described later), is the recording area being a continuous recording area to which a data area attribute, indicating that user data is physically recorded as the data, is added out of a plurality of types of attributes, and being closest to an edge portion on an innermost circumferential side of the information recording medium.

According to this aspect, it is possible to preferably receive the above-mentioned various benefits by recording such address.

Incidentally, even after the format process is performed on the information recording medium, as long as the continuous recording area with the data area attribute added exists on the information recording medium, the address of the edge portion on the outermost circumferential side of the recording area, which is a continuous recording area to which the data area attribute is added and which is closest to the edge portion on the innermost circumferential side of the information recording medium (in particular, a user data area), is included in the physical position information. More specifically, even after the data recorded on the information recording medium is logically deleted because the format process is performed on the information recording medium, as long as the continuous recording area with the data area attribute added physically exists on the information recording medium, the address of the edge portion on the outermost circumferential side of the recording area, which is a continuous recording area to which the data area attribute is added and which is closest to the edge portion on the innermost circumferential side of the information recording medium (in particular, a user data area), is recorded. Namely, the address of the edge portion on the outermost circumferential side of the recording area, which is a continuous recording area physically existing on the information recording medium with the data area attribute added and which is closest to the edge portion on the innermost circumferential side of the data recording area, is recorded into the recording management area.

In another aspect of the information recording medium of the present invention, the logical position information includes an address of an edge portion on an innermost circumferential side of the logical buffer area.

According to this aspect, it is possible to preferably receive the above-mentioned various benefits by recording such address.

In another aspect of the information recording medium of the present invention, the logical position information includes an address of an edge portion on an outermost circumferential side of a recording area, the recording area being logically efficient and to which a data area attribute, indicating that user data is physically recorded as the data, is added out of a plurality of types of attributes.

According to this aspect, it is possible to preferably receive the above-mentioned various benefits by recording such address.

In another aspect of the information recording medium of the present invention, it is provided with a first recording layer and a second recording layer, in each of which the data can be rewritten.

According to this aspect, it is possible to preferably receive the above-mentioned various benefits even on the information recording medium provided with the plurality of recording layers.

In this aspect, the physical position information may include each of (i) an address of an edge portion on an outermost circumferential side of a recording area (e.g. the outermost address of the formatted area on the L0 layer, described later), is the recording area being a continuous recording area to which a data area attribute, indicating that user data is physically recorded as the data, is added out of a plurality of types of attributes, and being closest to an edge portion on an innermost circumferential side of the first recording layer, and (ii) an address of an edge portion on an outermost circumferential side of a recording area (e.g. the outermost address of the innermost formatted area on the L1 layer, described later), the recording area being a continuous recording area to which the data attribute is added and being closest to an edge portion on an innermost circumferential side of the second recording layer.

By virtue of such construction, it is possible to preferably receive the above-mentioned various benefits by recording such addresses.

(Information Recording Apparatus)

The above object of the present invention can be also achieved by an information recording apparatus provided with: a recording device for recording data onto an information recording medium on which the data can be rewritten; and a controlling device for controlling the recording device to record, as the data, recording management data for managing recording of the data on the information recording medium, the recording management data including: (i) physical position information indicating a position of a physical buffer area in which buffer data for buffering a recording operation is physically recorded as the data and (ii) logical position information indicating a position of a logical buffer area in which the buffer data is logically recorded or to be recorded as the data.

According to the information recording apparatus of the present invention, by the operation of the recording device, the data is recorded onto the information recording medium. At this time, by the operation of the controlling device, the recording device is controlled to record the recording management data into the recording management area. The recording management data includes the physical position information and the logical position information, as described above.

Therefore, according to the information recording apparatus of the present invention, as in the above-mentioned information recording medium of the present invention, it is possible to relatively reduce a time length required for the compatibility process. In other words, it is possible to select whether or not to newly and physically record the buffer data, as occasion demands. Thus, it is possible to efficiently form the buffer area.

Incidentally, in response to the various aspects of the above-mentioned information recording medium of the present invention, the information recording apparatus of the present invention can also adopt various aspects.

In one aspect of the information recording apparatus of the present invention, the physical position information includes a flag indicating whether or not the physical buffer area is formed on the information recording medium.

According to this aspect, it is possible to preferably receive the above-mentioned various benefits by recording such flag.

In another aspect of the information recording apparatus of the present invention, the physical position information includes an address of an edge portion on an outermost circumferential side of a recording area, the recording area being a continuous recording area to which a data area attribute, indicating that user data is physically recorded as the data, is added out of a plurality of types of attributes, and being closest to an edge portion on an innermost circumferential side of the information recording medium.

According to this aspect, it is possible to preferably receive the above-mentioned various benefits by recording such address.

In another aspect of the information recording apparatus of the present invention, the logical position information includes an address of an edge portion on an innermost circumferential side of the logical buffer area.

According to this aspect, it is possible to preferably receive the above-mentioned various benefits by recording such address.

In another aspect of the information recording apparatus of the present invention, the logical position information includes an address of an edge portion on an outermost circumferential side of a recording area, the recording area being logically efficient and to which a data area attribute, indicating that user data is physically recorded as the data, is added out of a plurality of types of attributes.

According to this aspect, it is possible to preferably receive the above-mentioned various benefits by recording such address.

In another aspect of the information recording apparatus of the present invention, the information recording medium is provided with a first recording layer and a second recording layer, in each of which the data can be rewritten.

According to this aspect, it is possible to preferably receive the above-mentioned various benefits even on the information recording medium provided with the plurality of recording layers.

In this aspect, the physical position information may include each of (i) an address of an edge portion on an outermost circumferential side of a recording area (e.g. the outermost address of the formatted area on the L0 layer, described later), the recording area being a continuous recording area to which a data area attribute, indicating that user data is physically recorded as the data, is added out of a plurality of types of attributes, and being closest to an edge portion on an innermost circumferential side of the first recording layer, and (ii) an address of an edge portion on an outermost circumferential side of a recording area (e.g. the outermost address of the innermost formatted area on the L1 layer, described later), the recording area being a continuous recording area to which the data attribute is added and being closest to an edge portion on an innermost circumferential side of the second recording layer.

By virtue of such construction, it is possible to preferably receive the above-mentioned various benefits by recording such address.

In another aspect of the information recording apparatus of the present invention, it is provided with: a compatibility device for performing a compatibility process to provide compatibility with a read-only information recording medium; and a judging device for judging a positional relationship between the physical buffer area and the logical buffer area, the compatibility device setting a disc status for indicating a compatibility state of the information recording medium to compatibility-already-processed status, if it is judged by the judging device that the physical buffer area is in a same position of or outer than the logical buffer area, the compatibility device recording the buffer data into the logical buffer area indicated by the logical position information and setting the disc status to compatibility-already-processed status, if it is judged by the judging device that the physical buffer area is inner than the logical buffer area.

According to this aspect, even if the logical buffer area is formed along with the data recording, if the physical buffer area is not physically deleted (in other words, if the physical buffer area is in the same position of or outer than the logical buffer area), the compatibility process can be completed by using the physical buffer area, without newly and physically recording the buffer data into the logical buffer area. Namely, if the disc status is reset, the compatibility process can be completed. On the other hand, if the physical buffer area is physically deleted (in other words, if the physical buffer area is inner than the logical buffer area), the compatibility process can be completed by newly and physically recording the buffer data into the logical buffer area. As described above, according to the present invention, it is possible to relatively reduce a time length required for the compatibility process. In other words, it is possible to select whether or not to newly and physically record the buffer data, as occasion demands. Thus, it is possible to efficiently form the buffer area.

(Information Recording Method)

The above object of the present invention can be also achieved by an information recording method provided with: a first recording process of recording data onto an information recording medium on which the data can be rewritten; and a second recording process of recording, as the data, recording management data for managing recording of the data on the information recording medium, the recording management data including: (i) physical position information indicating a position of a physical buffer area in which buffer data for buffering a recording operation is physically recorded as the data and (ii) logical position information indicating a position of a logical buffer area in which the buffer data is logically recorded or to be recorded as the data.

According to the information recording method of the present invention, it is possible to receive the same various benefits as those of the above-mentioned information recording apparatus of the present invention.

Incidentally, in response to the various aspects of the above-mentioned information recording apparatus of the present invention, the information recording method of the present invention can also adopt various aspects.

(Computer Program)

The above object of the present invention can be also achieved by a computer program for recording control to control a computer provided for the above-mentioned information recording apparatus (including its various aspects), the computer program making the computer function as at least one portion of the recording device and the controlling device.

According to the computer program of the present invention, the above-mentioned information recording apparatus of the present invention can be embodied relatively readily, by loading the computer program from a recording medium for storing the computer program, such as a ROM, a CD-ROM, a DVD-ROM, a hard disk or the like, into the computer, or by downloading the computer program, which may be a carrier wave, into the computer via a communication device.

Incidentally, in response to the various aspects of the above-mentioned information recording apparatus of the present invention, the computer program of the present invention can adopt various aspects.

The above object of the present invention can be also achieved by a computer program product in a computer-readable medium for tangibly embodying a program of instructions executable by a computer, the computer program product making the computer function as at least one portion of the recording device and the controlling device.

According to the computer program product of the present invention, the aforementioned information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus of the present invention. As explained above, according to the information recording medium of the present invention, the recording management data including the physical position information and the logical position information is recorded. According to the information recording apparatus of the present invention, it is provided with the recording device and the controlling device. According to the information recording method of the present invention, it is provided with the first recording process and the second recording process. According to the computer-readable recording medium of the present invention, it makes a computer function as at least one portion of the recording device and the controlling device. Therefore, it is possible to efficiently form the buffer area.

BRIEF DESCRIPTION OF DRAWINGS

FIG. 2 is a schematic cross sectional view showing the optical disc and its corresponding schematic conceptual view showing the recording area structure in the radial direction.

FIG. 3 are an explanatory diagram conceptually showing the data structure of the optical disc after a normal format process is performed thereon, and an explanatory diagram conceptually showing the data structure of the optical disc after a quick format process is performed thereon.

FIG. 4 is a view conceptually showing transition in states of the optical disc.

FIG. 5 is a data structure diagram conceptually showing the data structure related to an attribute added when data is recorded.

FIG. 6 is a data structure diagram conceptually showing the data structure of RMD recorded into RMA.

FIG. 7 is a data structure diagram conceptually showing the data structure of each of fields constituting the RMD with regard to a format 2 and a format 3.

FIG. 8 is a data structure diagram showing the data structure of a field 0 of the RMD of the format 3.

FIG. 9 is a data structure diagram showing the data structure of a field 3 of the RMD of the format 3.

FIG. 11 is a block diagram conceptually showing the basis structure of an information recording/reproducing apparatus in an embodiment of the present invention.

FIG. 19 is an explanatory diagram conceptually showing the logical state of the optical disc in the state shown in FIG. 18, in association with the area structure of the optical disc.

Figure 1A:
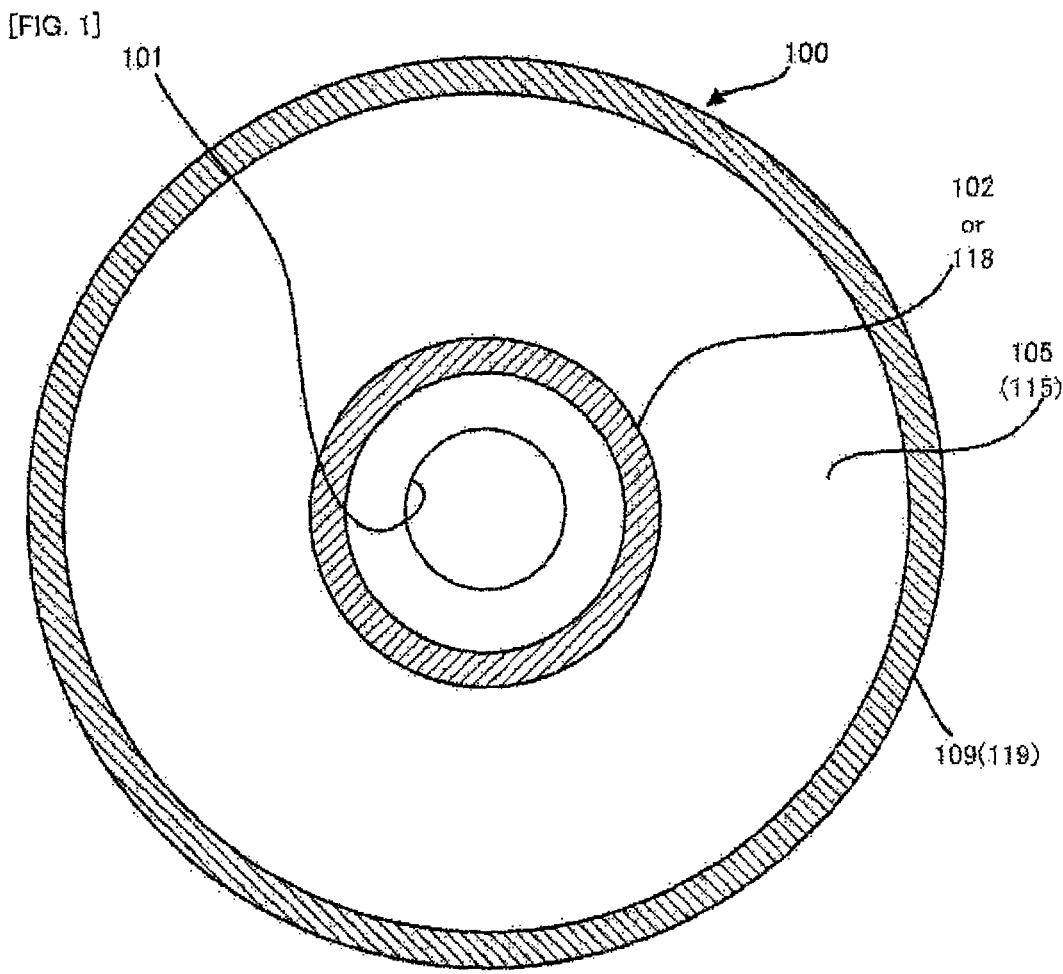
FIG. 1 are a substantial plan view showing the basic structure of an optical disc in an embodiment of the present invention, and a schematic cross sectional view showing the optical disc and its corresponding schematic conceptual view showing a recording area structure in the radial direction.

DESCRIPTION OF REFERENCE CODES 100 optical disc
102 lead-in area
105, 115 user data area
106, 116 shifted middle area
108 intermediate marker
109, 119 fixed middle area
118 lead-out area
121 start sector number of shifted middle area
122 physical shifted middle area recorded flag
123 end sector number of RZone
124 last recorded address
125 outermost address of formatted area on L0 layer
126 outermost address of innermost-formatted area on L1 layer
200 information recording/reproducing apparatus
300 disc drive
352 optical pickup
353 signal recording/reproducing device
354, 359 CPU
400 host computer

BEST MODE FOR CARRYING OUT THE INVENTION

Hereinafter, the best mode for carrying out the invention will be explained in order in each embodiment with reference to the drawings.

(Information Recording Medium)

Figure 1B:
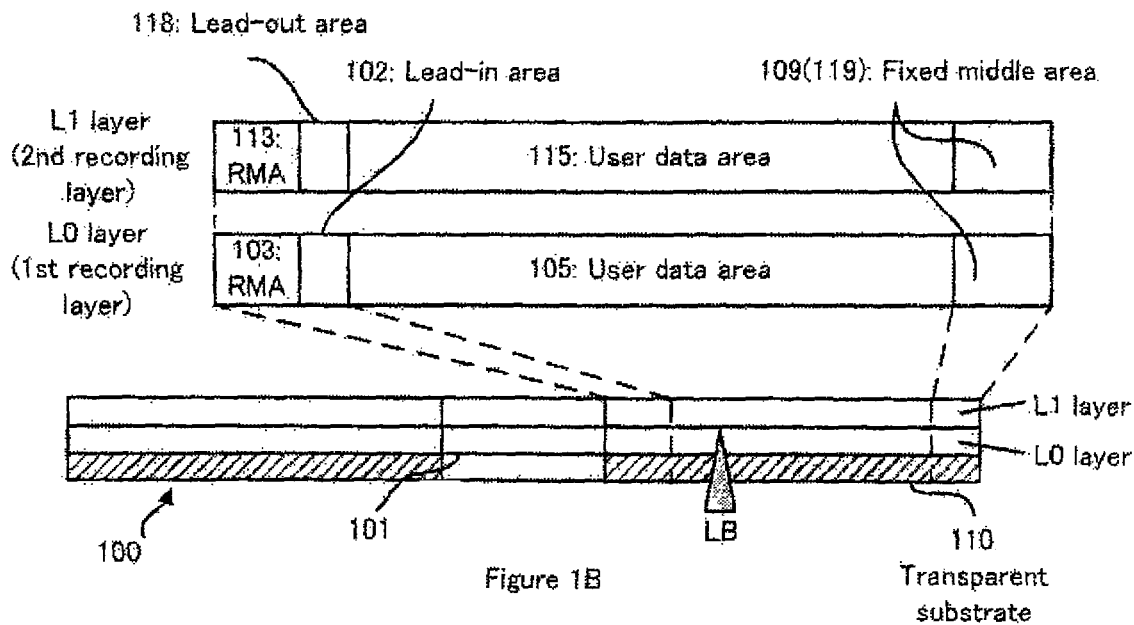

Firstly, with reference to FIG. 1, an optical disc 100 will be explained as an embodiment of the information recording medium of the present invention. FIG. 1(*a*) is a substantial plan view showing the basic structure of the optical disc 100 in the embodiment, and FIG. 1(*b*) is a schematic cross sectional view showing the optical disc 100 and its corresponding schematic conceptual view showing a recording area structure in the radial direction.

As shown in FIG. 1(*a*) and FIG. 1(*b*), the optical disc 100 has a recording surface on a disc main body with a diameter of about 12, cm, as is a DVD. On the recording surface, the optical disc 100 is provided with: a center hole 101 as the center; a lead-in area 102 or a lead-out area 118; user data areas 105 and 115; and fixed middle areas 109 and 119. Then, the optical disc 100 has recording layers or the like laminated on a transparent substrate 110. In each recording area of the recording layers, a track or tracks, such as groove tracks and land tracks, are alternately placed, spirally or concentrically, centered on the center hole 101, for example. On the track, data is divided and recorded by a unit of ECC block. The ECC block is a data management unit by which record information is error-correctable.

Incidentally, the present invention is not particularly limited to the optical disc having these three areas. For example, even if the lead-in area 102, the lead-out area 118 or the fixed middle area 109 (119) does not exist, a data structure explained below can be constructed. Moreover, as described later, the lead-in area 102, the lead-out area 118 or the fixed middle area 109 (119) may be further segmentalized.

In particular, the optical disc 100 in the embodiment, as shown in FIG. 1(*b*), has such a structure that an L0 layer and an L1 layer, which constitute one example of the "first and second record layers" of the present invention descried later, respectively, are laminated on the transparent substrate 110. Upon the recording/reproduction of such a two-layer type optical disc 100, the recording/reproduction of various data in the L0 layer or the recording/reproduction of various data, in the L1 layer is performed, depending on which recording layer has the focus position of laser light LB, irradiated from the lower side to the upper side in FIG. 1(*b*). Particularly in the L0 layer, the various data is recorded from the inner circumferential side to the outer circumferential side, whereas in the L1 layer, the various data is recorded from the outer circumferential side to the inner circumferential side. Namely, the optical disc 100 in the embodiment corresponds to an optical disc of an opposite track path type. However, even an optical disc of a parallel track path type can receive various benefits described below by adopting the following structure explained.

Moreover, the optical disc 100 in the embodiment is provided with a RMA (Recording Management Area) 103 (113) on the inner circumferential side of the lead-in area 102 and the lead-out area 118.

The RMA 103 (113) is a recording area to record therein RMD (Recording Management Data) for managing the recording of the data onto the optical disc 100. The more specific data structure of the RMD will be described in detail later (refer to FIG. 6 to FIG. 9).

Moreover, the optical disc 100 in the embodiment is constructed to record the data a plurality of times into the same area portion, as in a DVD-RW, for example. Specifically, a recording film provided for each of the L0 layer and the L1 layer includes a phase change film, for example. The phase change film transits between a crystalline state and a non-crystalline state (amorphous state), which realizes the plurality of times of data recording.

Moreover, the optical disc 100 in the embodiment adopts layer jump recording of recording the data alternately into the L0 layer and the L1 layer. Specifically explaining the layer jump recording, after the user data is recorded into a partial recording area of the user data area 105 in the L0 layer, the user data is recorded into a partial recording area of the user data area 115 in the L1 layer facing the partial recording area of the L0 layer. Then, after the user data is recorded into another partial recording area of the user data area 105 in the L0 layer, the data is recorded into another partial recording area of the user data area 115 in the L1 layer facing the another partial recording area of the L0 layer. After that, this operation is repeated.

Incidentally, a method of recording the user data onto the optical disc 100 in the embodiment is not limited to the layer jump recording. For example, it may be constructed such that after the user data is recorded into the entire user data area 105 in the L0 layer, the user data is recorded into the entire user data area 115 in the L1 layer.

Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers, or of a single layer type having one recording layer.

Incidentally, the fixed middle area 109 (119) is formed to provide compatibility between a read-only optical disc, such as a DVD-ROM, and the optical disc 100 in the embodiment, after the data is recorded into the entire user data area 105 (115). Namely, the middle area 109 (119) is formed to equalize the area structure on the two-layer type read-only optical disc and the area structure on the optical disc 100 in the embodiment.

In addition, the fixed middle area 109 (119) has a function (i.e. a buffering function) to prevent an optical pickup from jumping to an unrecorded area (specifically on the outer circumferential side of the fixed middle area 109 (119)), in performing the layer jump to change the recording layer or in accessing near the fixed middle area 109 (119), after the user data is recorded in the entire user data area 105 (115). More specifically, if the fixed middle area 109 (119) is detected in searching the optical disc 100 while irradiating the laser light LB from the optical pickup, the optical pickup is displaced to the inner circumferential side. This can eliminate such a disadvantage that the optical pickup accesses an area portion outer than the fixed middle area 109 (119). This function is referred to a fail safe mechanism.

Moreover, as in the fixed middle area 109 (119), the lead-in area 102 and the lead-out area 118 also have a function to prevent the optical pickup from jumping to an unrecorded area (specifically on the inner circumferential side of the lead-in area 102 and the lead-out area 118), in performing the layer jump to change the recording layer or in accessing the lead-in area 102 and the lead-out area 118. More specifically, if the lead-in area 102 and the lead-out area 118 are detected in searching the optical disc 100 while irradiating the laser light LB from the optical pickup, the optical pickup is displaced to the outer circumferential side. This can eliminate such a disadvantage that the optical pickup accesses an area portion inner than the lead-in area 102 and the lead-out area 118.

Incidentally, if the user data is recorded only in one portion of the user data area 105 (115), instead of the fixed middle area 109 (119), a shifted middle area 106 (116) is used.

Now, with reference to FIG. 2, the shifted middle area 106 (116) will be explained. FIG. 2 is a schematic cross sectional view showing the optical disc and its corresponding schematic conceptual view showing the recording area structure in the radial direction.

As shown in FIG. 2, the shifted middle area 106 is disposed in the user data area 105 following the user data recorded in one portion of the user data area 105. In the same manner, the shifted middle area 116 is disposed in the user data area 115 following the user data recorded in one portion of the user data area 115.

By providing the shifted middle area 106 (116), even if the user data is recorded only in one portion of the user data area 105 (115), it is possible to provide compatibility between a read-only optical disc, such as a DVD-ROM, and the optical disc 100 in the embodiment. In addition, it is possible to prevent the optical pickup from jumping to the unrecorded area, in performing the layer jump. More specifically, if the shifted middle area 106 (116) is detected in searching the optical disc 100 while irradiating the laser light LB from the optical pickup, the optical pickup is displaced to the inner circumferential side. This can eliminate such a disadvantage that the optical pickup accesses an area portion outer than the shifted middle area 106 (116). Moreover, even if the layer jump is not performed, it is possible to prevent the optical pickup from jumping to the unrecorded area outer than the shifted middle area 106 (116). Thus, the read-only type information reproducing apparatus can reproduce the data recorded on the optical disc 100.

Namely, the shifted middle area 106 (116) has both the function of preventing the optical pickup from jumping and the function of maintaining the compatibility with the read-only type optical disc, in case that the user data is recorded only in one portion of the user data area 105 (115). In particular, if the layer jump recording is performed, the data is often recorded only in one portion of the user data area 105 (115). Therefore, the shifted middle area 106 (116) is efficiently used particularly in the layer jump recording.

On the other hand, the fixed middle area 109 (119) has both the function of preventing the optical pickup from jumping and the function of maintaining the compatibility with the read-only type optical disc, in case that the user data is recorded in the entire user data area 105 (115).

Into the lead-in area 102, the lead-out area 118, the fixed middle area 109 (119), and the shifted middle area 106 (116), predetermined data (e.g. various control data and padding data, such as "00h", or the like) is recorded by performing a normal format process on the optical disc 100. Moreover, in addition to the normal format process, a quick format process is performed to start the recording of the user data after only minimum necessary management information is recorded.

Now, with reference to FIG. 3 and FIG. 4, the normal format process and the quick format process will be specifically explained. FIG. 3 are an explanatory diagram conceptually showing the data structure of the optical disc 100 after the normal format process is performed thereon (FIG. 3(*a*)), and an explanatory diagram conceptually showing the data structure of the optical disc after the quick format process is performed thereon (FIG. 3(*b*)). FIG. 4 is a view conceptually showing transition in states of the optical disc 100.

As shown in FIG. 3(*a*), if the normal format process is performed, the predetermined data is recorded into the lead-in area 102 while a lead-in area attribute is added, and the predetermined data is recorded into the lead-out area 118 while the lead-out area 118 attribute is added.

Moreover, by recording the predetermined data into the recording area, following the user data recorded in the user data area 105, with a middle area attribute added, the shifted middle area 106 is formed. In the same manner, by recording the predetermined data into the recording area, following the user data recorded in the user data area 115, with a middle area attribute added, the shifted middle area 116 is formed. Alternatively, it may be constructed to record the predetermined user data into the user data area 105 (115) while a data area attribute is added depending on a format size requested from a host computer or the like described later, and then to form the shifted middle area 106 (116) following the recorded data.

By performing the normal format process in this manner, it is possible to substantially equalize the area structure on the optical disc 100 and the area structure on the read-only optical disc. The state of the optical disc 100 shown in FIG. 3(a) is referred to as a "complete state".

On the other hand, as shown in FIG. 3(b), if the quick format process is performed, minimum necessary data (specifically, RW-Physical format information and data to be recorded on the outer circumferential side of the RW-Physical format information, in case of a DVD-RW, which is one specific example of the optical disc 100) is recorded into the lead-in area 102, with the data area attribute added. This operation corresponds to operation of logically deleting the user data recorded in the user data area 105 (115) by deleting or overwriting various management data recorded in the lead-in area 102. Moreover, the predetermined user data is recorded into the user data area 105 (115) if needed, with the data area attribute added, depending on the format size requested from the host computer or the like described later.

Following the recorded user data, an intermediate marker 108 is formed. The intermediate marker 108 has a size of 32, ECC blocks and is recorded following the end edge portion of the recorded user data (specifically, the end edge portion of the area portion in which the use data is recorded, and the edge portion on the outer circumferential side in the L0 layer, or the edge portion on the inner circumferential side in the L1 layer). Therefore, if the user data is recorded into the user data area 105 (115) by an instruction of a user after the quick format process is performed, the user data is newly recorded starting from a position in which the intermediate marker 108 is recorded, so that a new intermediate marker 108 is recorded in the end edge portion of the newly recorded user data. Thus, the intermediate marker 108 indicates the end edge portion of the recorded user data and also indicates the area portion in which the user data is recorded next. Into the intermediate marker 108, the predetermined data is recorded if needed, with the lead-out area attribute added. The state of the optical disc 100 shown in FIG. 3(b) is referred to as an "intermediate state".

The intermediate marker 108 is used to detect the end edge portion of the recorded user data, for example. Specifically, it can preferably recognize the boundary between the intermediate marker 108 and the already recorded user data by seeking near the intermediate marker 108 with the laser light irradiated. In particular, in case that RMD (Recording Management Data) in which the address of the end edge portion of the recorded user data area (LRA: Last Recorded Address) is recorded cannot be read due to defects or the like, the content of the RMD can be restored by using the intermediate marker. Alternatively, since the content of the RMD is not always updated in real time, it is possible to recognize the end edge portion of the already recorded user data, highly accurately, by using the intermediate marker 108.

In addition, since the end edge portion of the already recorded user data can be recognized by using the intermediate marker 108, it is unnecessary to update and record (or re-record) the LRA in real time in response to the recording of the user data. Specifically, in case of a DVD-RW, which is one specific example of the optical disc 100, there is a tolerance of approximately 4, MB as the size of the user data between the position shown by the LRA and the actual position of the end edge portion of the already recorded user data. This does not excessively reduce the lifetime of the recording film provided for each of the L0 layer and the L1 layer as it is unnecessary to frequently update and record (or re-record) the LRA (i.e. the RMD including the LRA).

Incidentally, the format size requested from the host computer or the like may be "0". In this case, the intermediate marker 108 is formed so as to be adjacent to the data recorded in the lead-in area 102 while the data area attribute is added.

By performing the quick format process, it is possible to randomly overwrite the user data into the partial recording area of the user data area 105 with the data area attribute added. More specifically, in the recording area in which the user data is not recorded (in other words, the recording area with no attribute added), it is necessary to record the user data sequentially (in other words, continuously from the inner circumferential side to the outer circumferential side in the L0 layer, and continuously from the outer circumferential side to the inner circumferential side in the L1 layer). Namely, a NWA (Next Writable Address) indicating the recording area in which the user data can be recorded next indicates the head portion of the recording area in which the user data is not recorded, so that in the recording area outer than the NWA, it is necessary to record the user data in order (i.e. sequentially) from the recording area shown by the NWA. Incidentally, the position shown by the NWA can correspond to the start edge portion of the intermediate marker 108 (specifically, the edge portion on the inner circumferential side in case of the L0 layer, and the edge portion on the outer circumferential side in case of the L1 layer). However, in the recording area with the data area attribute added, located inner than the position shown by the NWA, it is possible to record the user data in a desired position (i.e. randomly). As described above, it can be said that the quick format process also has a function of expanding the recording area in which the user data can be recorded by updating the NWA.

Then, in the optical disc 100 on which the quick format process is performed, in contrast to the case where the normal format process is performed, all the necessary data is not recorded in the lead-in area 102 and the lead-out area 118 or the like. Therefore, after the quick format process is performed, a finalize process (or a close process) is further performed, by which various management information or various control information according to the recording aspect of the data on the optical disc 100 is recorded into the lead-in area 102 and the lead-out area 118 or the like. Moreover, the shifted middle area 106 (116) and the fixed middle area 109 (119) are formed following the recorded user data, and padding data, such as "00h" data, for example, is recorded into an unrecorded area between the lead-in area 102 and the shifted middle area 106 (or the fixed middle area 109) and an unrecorded area between the lead-out area 118 and the shifted middle area 116 (or the fixed middle area 119). By this, it is possible to reproduce the information recorded on the optical disc 100 in the embodiment, on the read-only type information reproducing apparatus.

Incidentally, depending on the size of the data to be recorded onto the optical disc 100, in some cases, the size of the data to be recorded into the L0 layer may not be equal to the size of the data to be recorded into the L1 layer. Specifically, in some cases, xGB of data may be recorded from the inner circumferential side to the outer circumferential side of the L1 layer, and the layer jump may be performed, and then, x/2, GB of data may be recorded from the outer circumferential side to the inner circumferential side of the L1 layer. In this case, in the L1 layer facing the recording area of the L0 layer in which the data is already recorded, there is the recording area in which the data is not recorded. On the other hand, from the viewpoint that the data is stably reproduced, some data needs to be recorded (in other words, it is needed not to be a mirror state) in the recording area of the L1 layer facing the recording area of the L0 layer in which the data is already recorded. Therefore, in the recording area of the L1 layer which faces the recording area of the L0 layer in which the data is already recorded and in which the data is not recorded, it is necessary to record the predetermined data while the data area attribute is added. Alternatively, in the recording area of the L1 layer which faces the recording area of the L0 layer in which the data is already recorded and in which the data is not recorded, it may be constructed to record the predetermined data (i.e. padding data or the like) while the lead-out area attribute is added.

Moreover, if the quick format process of recording the predetermined user data into the shifted middle area 106 (116) or the like while the data area attribute is added is performed on the optical disc 100 in the complete state shown in FIG. 3(*a*), it is possible to record the user data again onto the optical disc 100 which once goes into the complete state. As described above, the quick format process, performed to record the user data again onto the optical disc 100 in the complete state, can be also referred to as a quick grow format process.

As shown in FIG. 4, by performing the normal format process on the blank optical disc 100 on which the data is not recorded, the state of the optical disc 100 can be transited into the complete state shown in FIG. 3(*a*). In the same manner, by performing the quick format process on the blank optical disc 100 on which the data is not recorded, the state of the optical disc 100 can be transited into the intermediate state shown in FIG. 3(*b*).

By performing the normal format process on the optical disc 100 transited into the complete state, the state of the optical disc 100 can be maintained in the complete state shown in FIG. 3(*a*). Moreover, by performing the quick format process (in other words, the quick grow format process) on the optical disc 100 transited into the complete state, the state of the optical disc 100 can be transited into the intermediate state shown in FIG. 3(*b*).

By performing the quick format process on the optical disc 100 transited into the intermediate state, the state of the optical disc 100 can be maintained in the intermediate state shown in FIG. 3(*b*). Moreover, by performing the normal format process on the optical disc 100 transited into the intermediate state, the state of the optical disc 100 can be transited into the complete state shown in FIG. 3(*a*).

Next, with reference to FIG. 5, the attribute added when the data is recorded will be specifically explained. FIG. 5 is a data structure diagram conceptually showing the data structure related to the attribute added when data is recorded.

The attribute is added to each physical sector with a size of 2418, bytes, depending on the data to be recorded into the physical sector. One physical sector is provided with: a SYNC code with a size of 52, bytes; an ECC (Error Correction Code) with a size of 302, bytes; data with a size of 2048, bytes; a data ID with a size of 4, bytes; an IED with a size of 2, bytes; a CPR_, MAI with a size of 6, bytes; and an EDC with a size of 4, bytes. Then, the attribute is recorded in the data ID.

Specifically, as shown in FIG. 5, the data ID with a size of 4, bytes includes sector information with a size of 1, byte and a sector number with a size of 3, bytes.

The sector information with a size of 1, byte includes: a sector format type bit with a size of 1, bit; a tracking method bit with a size of 1, bit; a reflectivity bit with a size of 1, bit; a reserved area with a size of 1, bit; an area type bit with a size of 2, bits indicating the attribute; a data type bit with a size of 1, bit constituting one specific example of the "flag bit" of the present invention; and a layer number bit with a size of 1, bit.

The area type bit indicates the attribute of the physical sector including this area type bit. Specifically, for example, if "00b" is recorded, it indicates the physical sector has the data area attribute. If "01b" is recorded, it indicates the physical sector has the lead-in area attribute. If "10b" is recorded, it indicates the physical sector has the lead-out area attribute. If "11b" is recorded, it indicates the physical sector has the middle area attribute.

Next, with reference to FIG. 6 to FIG. 9, the specific data structure of the RMD recorded into the RMA 103 (113) will be explained. FIG. 6 is a data structure diagram conceptually showing the data structure of the RMD recorded into RMA 103 (113). FIG. 7 is a data structure diagram conceptually showing the data structure of each of fields constituting the RMD with regard to a format 2 and a format 3. FIG. 8 is a data structure diagram showing the data structure of a field 0 of the RMD of the format 3. FIG. 9 is a data structure diagram showing the data structure of a field 3 of the RMD of the format 3. Incidentally, in the explanation below, the RMA 103 will be explained for simplification of explanation; however, it will be obvious that the RMA 113 has the same data structure.

As shown in FIG. 6, the RMA 103 is divided into five RMA segments (#1 to #5). In each of the RMA segments (#1 to #5), 28, RMD sets (#1 to #28) can be recorded. In each of the RMD sets (#1 to #28), five RMD blocks can be recorded, each of which has a size of 32, KB. The five RMD blocks recorded in each of the RMD sets (#1 to #28) has the same content, except for one portion of the fields. In other words, the five RMD blocks indicating the same content are recorded into one RMD set redundantly. Each RMD block includes a linking loss area with a size of 2, KB and 15, fields (1 to 14) each of which has a size of 2, KB.

As shown in FIG. 7, on the optical disc 100 in the embodiment, the format2, RMD and the format3, RMD are recorded in the RMA 103. The format2, RMD has a function of pointer indicating the position of the format3 RMD which is effective (in other words, the newest). The format3, RMD actually includes information for managing the recoding of the data on the optical disc 100.

Specifically, as shown in FIG. 7, the format2, RMD includes: a linking loss area; common information; a pointer to RMD set; and a reserved area.

The format3, RMD includes: the linking loss area; common information; OPC (Optimum Power Control) related information; user specific data; recording status information; defect status bitmap; drive specific information; and disc testing area information.

The format2, RMD is recorded in the RMD set #1 at the head of each RMA segment, in order to indicates the position of the effective format3, RMD by using the pointer to RMD set. The format3, RMD is recorded in the RMD sets (#2 to #28) other than the RMD set #1 at the head of the RMA segment #1.

Specifically, if the normal format process or the quick format process is performed on the blank optical disc 100, the format3, RMD is recorded into the RMD set #2 (or the RMD sets #3 to #28), except for the RMD set #1 at the head of the RMA segment #1. Then, the format2, RMD to point a position in which the format3, RMD is recorded is recorded into the RMD set #1 at the head of the RMA segment #1.

As the recording of the data into the user data area 105 (115) progresses, the format3, RMD is updated. The format3, RMD is overwritten on the same RMD set #2 at each time of updating or in predetermined timing. It is overwritten many times, and in the end, a reading error occurs due to the overwriting beyond the upper limit of the rewriting times or scratches and dust or the like. Then, if the format3, RMD cannot be read in a plurality of RMD blocks out of the five RMD blocks included in the RMD set #2, the format3, RMD is newly recorded into the RMD set #3 other than the RMD set #2. In this case, the format2, RMD is also updated with the change of the position in which the format3, RMD is recorded, and it is overwritten on the RMD set #1. After that, such an operation is performed on the RMD sets #3 to #28. Then, if it is judged that the format3, RMD cannot be read with respect to all the RMD sets of the RMA segment #1, the format3, RMD is newly recorded into the RMD set #2 of the RMA segment #2, and the format2 RMD is newly recorded into the RMD set #1 of the RMA segment #2. After that, such an operation is performed on the RMA segments #2 to #5.

Moreover, if the format2, RMD cannot be read in a plurality of RMD blocks out of the five RMD blocks included in the RMD set #1 of the RMA segment #1, the format2, RMD and the format3, RMD are recorded by using the RMA segment #2. In this case, even if the format3, RMD can be read from any of the RMD sets #2 to #28 of the RMA segment #1, the format2, RMD and the format3, RMD are recorded by using the next RMA segment #2.

Next, as shown in FIG. 8, the common information recorded in the field 0 of the format3, RMD (i.e. the common information recorded in the field 0 of the format2, RMD) includes: a RMD format in a byte position of "0, to 1", ; a disc status in a byte position of "2", ; a unique disc ID in a byte positions of "4, to 21", ; a copy of pre-pit information in a byte position of "22, to 85", ; a start sector number of the shifted middle area 121 in a byte position of "86, to 89", ; a pre-recorded/embossed information code in a byte position of "90", ; an end address of pre-recorded/embossed lead-in area in a byte position of "92, to 95", ; an end address of pre-recorded/embossed middle area on L0 layer in a byte position of "96, to 99", ; a start address of pre-recorded/embossed middle area on L1 layer in a byte position of "100, to 103", ; a start address of pre-recorded/embossed lead-out area in a byte position of "104, to 107", ; RBG information in a byte position of "128", ; and reserved areas.

1, bit of the pre-recorded/embossed information code is used as a physical shifted middle area recorded flag 122. The physical shifted middle area recorded flag 122 indicates whether or not the shifted middle area 106 (116), formed by physically recording the data with the middle area attribute, exists on the optical disc 100. In other words, whether or not the shifted middle area 106 (116) is logically deleted by updating the RMD, the physical shifted middle area recorded flag 122 indicates whether or not the shifted middle area 106 (116) physically exists on the optical disc 100. For example, if there is the shifted middle area 106 (116) formed by physically recording the data with the middle area attribute, the shifted middle area recorded flag 122 is set to "1b". On the other hand, if there is no shifted middle area 106 (116) formed by physically recording the data with the middle area attribute, the shifted middle area recorded flag 122 is set to "0b".

Next, as shown in FIG. 9, the recording status information recorded in the field 3 of the format3, RMD includes: a format operation code in a byte position of "0", ; format information #1 in a byte position of "2, to 5", ; format information #2 in a byte positions of "6, to 9", ; a last RZone number in a byte position of "256, to 257", ; a start sector number of the RZone in a byte position of "258, to 261", ; an end sector number 123 of RZone in a byte position of "262 to 265", ; a LJA (Layer Jump Address on L0 layer) in a byte position of "512, to 515"; a LRA (Last Recorded Address) 124 in a byte position of "516, to 519"; a PLJA (Previous Layer Jump Address on L0 layer) in a byte position of "520, to 523"; a jump interval in a byte position of "524, to 525"; an outermost address 125 of the formatted area on L0 layer in a byte position of "528, to 531"; an outermost address 126 of the innermost-formatted area on L1 layer in a byte position of "532, to 535"; an outermost address of the inner most-recorded area on L1 layer in a byte position of "536, to 539"; and reserved areas.

Now, with reference to FIG. 10, an explanation will be given for specific positions indicated by each of (i) an outermost address 125 of the formatted area on the L0 layer and (ii) an outermost address 126 of the innermost formatted area on the L1 layer, which are included in the recording status information recorded in the field 3 of the format3, RMD. FIG. 10 are explanatory diagrams showing specific positions indicated by each of the outermost address 125 of the formatted area on the L0 layer and the outermost address 126 of the innermost formatted area on the L1 layer.

Figure 10A:
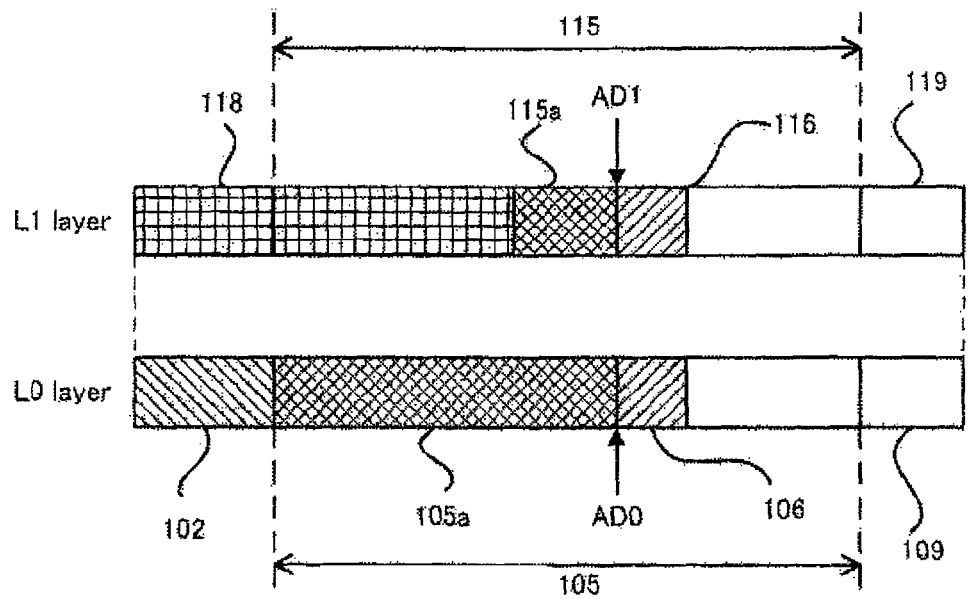
FIG. 10 are explanatory diagrams showing specific positions indicated by each of an outermost address of the formatted area on a L0 layer and an outermost address of the innermost formatted area on a L1 layer.

As shown in FIG. 10(a), the outermost address 125 of the formatted area on the L0 layer indicates an address AD0. More specifically, the address AD0 of the edge portion on the outer circumferential side of an area 105a, which is a continuous recording area in the L0 layer to which the data area attribute is added and which is a recording area closest to the edge portion on the innermost circumferential side of the user data area 105 (in other words, on the innermost circumferential side of the optical disc 100), is recorded into the field 3 of the format3, RMD, as the outermost address 125 of the formatted area on the L0 layer. Namely, the attribute of the user data area 105 inner than the address AD0 (particularly, the data recordable area which does not include the lead-in area 102 nor the lead-out area 118) is the data area attribute.

In this case, since the optical disc 100 adopts the opposite track path method, the address in the L0 layer increases from the inner circumferential side to the outer circumferential side. Therefore, the maximum address of the area 105a, is recorded as the outermost address 125 of the formatted area on the L0 layer.

In the same manner, the outermost address 126 of the innermost formatted area on the L1 layer indicates an address AD1. More specifically, the address AD1 of the edge portion on the outer circumferential side of an area 115a, which is a continuous recording area in the L1 layer to which the data area attribute is added and which is a recording area closest to the edge portion on the innermost circumferential side of the user data area 115 (in other words, on the innermost circumferential side of the optical disc 100), is recorded into the field 3 of the format3, RMD, as the outermost address 126 of the innermost formatted area on the L1 layer. Namely, the attribute of the user data area 115 inner than the address AD1 (particularly, the data recordable area which does not include the lead-in area 102 and the lead-out area 118) is the data area attribute.

In this case, since the optical disc 100 adopts the opposite track path method, the address in the L1 layer reduces from the inner circumferential side to the outer circumferential side. Therefore, the minimum address of the area 115a, is recorded as the outermost address 126 of the innermost formatted area on the L1 layer.

Particularly in the embodiment, even after the format process is performed on the optical disc 100, the address AD0 of the edge portion on the outer circumferential side of the area 105a, which is a continuous recording area in the L0 layer to which the data area attribute is added and which is a recording area closest to the edge portion on the innermost circumferential side of the user data area 105, is recorded as the outermost address 125 of the formatted area on the L0 layer. More specifically, even after the data recorded in the area 105a, is logically deleted by performing the format process on the optical disc 100, as long as the area 105a, physically exists, the address AD0 of the edge portion on the outermost circumferential side of the area 10a, is recorded as the outermost address 125 of the formatted area on the L0 layer. Namely, the address of the edge portion on the outer circumferential side of the area, which is a continuous recording area in the L0 layer physically existing on the optical disc 100 with the data area attribute added and which is a recording area closest to the edge portion on the innermost circumferential side of the user data area 105, is recorded.

In the same manner, even after the format process is performed on the optical disc 100, the address AD1 of the edge portion on the outer circumferential side of the area 115a, which is a continuous recording area in the L1 layer to which the data area attribute is added and which is a recording area closest to the edge portion on the innermost circumferential side of the user data area 115, is recorded as the outermost address 126 of the innermost formatted area on the L1 layer. More specifically, even after the data recorded in the area 115a, is logically deleted by performing the format process on the optical disc 100, as long as the area 115a, physically exists, the address AD1 of the edge portion on the outermost circumferential side of the area 115a, is recorded as the outermost address 126 of the innermost formatted area on the L1 layer. Namely, the address of the edge portion on the outer circumferential side of the area, which is a continuous recording area in the L1 layer physically existing on the optical disc 100 with the data area attribute added and which is a recording area closest to the edge portion on the innermost circumferential side of the user data area 115, is recorded.

Figure 10B:
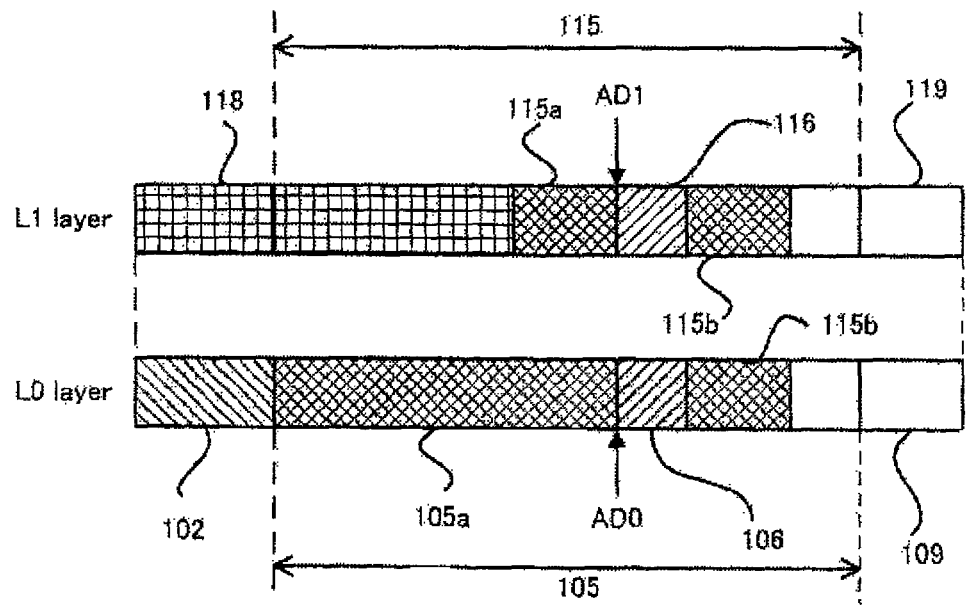

Moreover, as shown in FIG. 10(b), there may be areas 105a, and 105b which are continuous recording areas in the L0 layer to which the data area attribute is added. In this case, the address AD0 of the edge portion on the outer circumferential side of the area 105a, out of the areas 105a, and 105b, which is the recording area closest to the edge portion on the innermost circumferential side of the user data area 105, is recorded into the field 3 of the format3, RMD, as the outermost address 125 of the formatted area on the L0 layer. In the same manner, there may be areas 115a, and 115b, which are continuous recording areas in the L1 layer to which the data area attribute is added. In this case, the address AD1 of the edge portion on the outer circumferential side of the area 115a, out of the areas 116a, and 118b, which is the recording area closest to the edge portion on the innermost circumferential side of the user data area 115, is recorded into the field 3 of the format3, RMD, as the outermost address 126 of the innermost formatted area on the L1 layer.

Incidentally, the "continuous recording area to which the data area attribute is added" means a series of recording areas to which the attribute other than the data area attribute is not added. Namely, in FIG. 10(a) and FIG. 10(b), each of the area 105a, the area 105b, the area 115a, and the area 115b, corresponds to the series of recording areas to which the attribute other than the data area attribute is not added. On the other hand, between the area 105a, and the area 105b, there is formed the shifted middle area 106 to which the middle area attribute other than the data area attribute is added. Thus, the series of recording area obtained by combining the area 105a, and the area 105b, is not the "continuous recording area to which the data area attribute is added".

(Information Recording/Reproducing Apparatus)

(1) Basic Structure

Next, with reference to FIG. 11, an information recording/reproducing apparatus 200 as an embodiment of the information recording apparatus of the present invention will be explained. FIG. 11 is a block diagram conceptually showing the basis structure of the information recording/reproducing apparatus 200 in the embodiment of the present invention. Incidentally, the information recording/reproducing apparatus 200 has a function of recording the data onto the optical disc 100 and a function of reproducing the data recorded on the optical disc 100.

As shown in FIG. 11, the information recording/reproducing apparatus 200 is provided with: a disc drive 300 on which the optical disc 100 is actually loaded and the data is recorded or reproduced; and a host computer 400, such as a personal computer, for controlling the recording and reproduction of the data with respect to the disc drive.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates in accessing the optical disc 100. More specifically, the spindle motor 351 is constructed to rotate the optical disc 100 at a predetermined speed and stop, under the spindle servo provided by a not-illustrated servo unit or the like.

The optical pickup 352 is provided with a semiconductor laser apparatus and a collimator lens and an objective lens or the like, which are not illustrated, in order to perform the recording/reproducing with respect to the optical disc 100. More specifically, the optical pickup 352 irradiates the optical disc 100 with a light beam, such a laser beam, as reading light with a first power upon reproduction, and as writing light with a second power with it modulated upon recording.

The signal recording/reproducing device 353 constitutes one specific example of "recording device" of the present invention and performs the recording/reproducing with respect to the optical disc 100 by controlling the spindle motor 351 and the optical pickup 352 under the control of the CPU 354. More specifically, the signal recording/reproducing device 353 is provided with a laser diode (LD) driver, a head amplifier, and the like. The LD driver generates a driving pulse, for example, and drives the semiconductor laser apparatus built in the optical pickup 352. The head amplifier amplifies the output signal of the optical pickup 352, i.e., the reflected light of the laser light, and outputs the amplified signal.

The memory 355 is used in the general data processing and the OPC process on the disc drive 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, i.e., firmware is stored; a buffer for temporarily storing the record/reproduction data; a Random Access Memory (RAM) area into which a parameter required for the operation of the firmware program or the like is stored; and the like.

The CPU (drive control device) 354 constitutes one specific example of "controlling device" and "compatibility device" of the present invention, is connected to the signal recording/reproducing device 353 and the memory 355 via the bus 357, and controls the entire disc drive 300 by giving instructions to various devices. In general, software or firmware for operating the CPU 354 is stored in the memory 355.

The data input/output control device 306 controls the data input/output from the outside with respect to the disc drive 300, and stores the data into or extracts it from a data buffer on the memory 355. A drive control command, which is issued from the external host computer 400 connected to the disc drive 300 via an interface, such as a SCSI (Small Computer System Interface) and an ATAPI (AT Attachment Packet Interface), is transmitted to the CPU 354 through the data input/output control device 306. Moreover, the record/reproduction data is also exchanged with the host computer 400 through the data input/output control device 306.

The operation/display control device 307 performs the reception of the operation instruction and display with respect to the host computer 400. The operation/display control device 307 sends the instruction to perform the recording or reproduction by using the operation bottom 310, to the CPU 359. The CPU 359 sends a control command to the disc drive 300 through the input/output control device 308 on the basis of the instruction information from the operation/display control device 307, to thereby control the entire disc drive 300. In the same manner, the CPU 359 can send a command of requiring the disc drive 300 to send the operational state to the host, to the disc drive 300. By this, it is possible to recognize the operational state of the disc drive 300, such as during recording and during reproduction. Thus, the CPU 359 can output the operational state of the disc drive 300, to the display panel 311, such as a fluorescent tube and a LCD, through the operation/display control device 307.

The memory 360 is an inner storage device used by the host computer 400, and is provided with: a ROM area into which a firmware program, such as BIOS (Basic Input/Output System), is stored; and a RAM area into which a parameter required for the operation of an operating system, an application program, or the like is stored; and the like. The memory 360 may be also connected to a not-illustrated external storage device, such as a hard disk, through the input/output control device 308.

One specific example in which the disc drive 300 and the host computer 400, as explained above, are used together is household equipment, such as recorder equipment for recording/reproducing a video. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 360, on the CPU 359. Moreover, in another specific example, the disc drive 300 is a disc drive (hereinafter referred to as a drive, as occasion demands), and the host computer 400 is a personal computer or a workstation. The host computer 400, such as the personal computer, and the disc drive are connected to each other through the data input/output control devices 306 and 308, such as the SCSI and the ATAPI. An application, such as writing software, which is installed in the host computer 400, controls the disc drive.

(2) Operation Principle

Figures 12A, 12B:
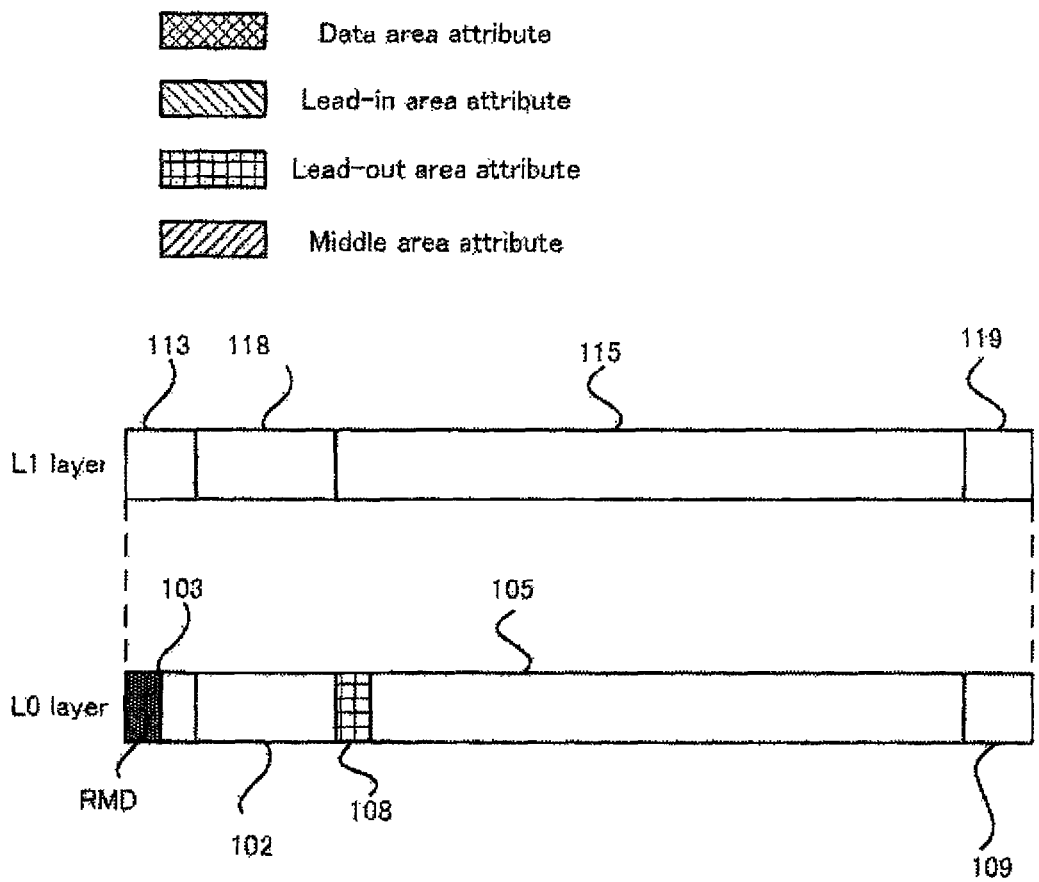
FIG. 12 are an explanatory diagram conceptually showing one procedure in which user data is recorded by the operation of the information recording/reproducing apparatus in the embodiment in association with the area structure of the optical disc, and a table showing the specific value of RMD at that time.

Next, with reference to FIG. 12 to FIG. 22, the operation principle of the information recording/reproducing apparatus 200 in the embodiment will be explained. FIG. 12 are an explanatory diagram conceptually showing one procedure in which user data is recorded by the operation of the information recording/reproducing apparatus in the embodiment in association with the area structure of the optical disc, and a table showing the specific value of RMD at that time. FIG. 13 to FIG. 18, and FIG. 20 to FIG. 22 are an explanatory diagram conceptually showing other procedure in which the user data is recorded by the operation of the information recording/reproducing apparatus in the embodiment in association with the area structure of the optical disc, and a table showing the specific value of RMD at that time. FIG. 19 is an explanatory diagram conceptually showing the logical state of the optical disc in the state shown in FIG. 18, in association with the area structure of the optical disc. Incidentally, in FIG. 12 to FIG. 22, only partial data of the RMD is selectively extracted and explained.

As shown in FIG. 12(*a*), firstly, the quick format process is performed on the blank optical disc 100. By this, the intermediate marker 108 is recorded, and the RMD is initialized, as shown in FIG. 12(*b*).

Figures 13A, 13B:
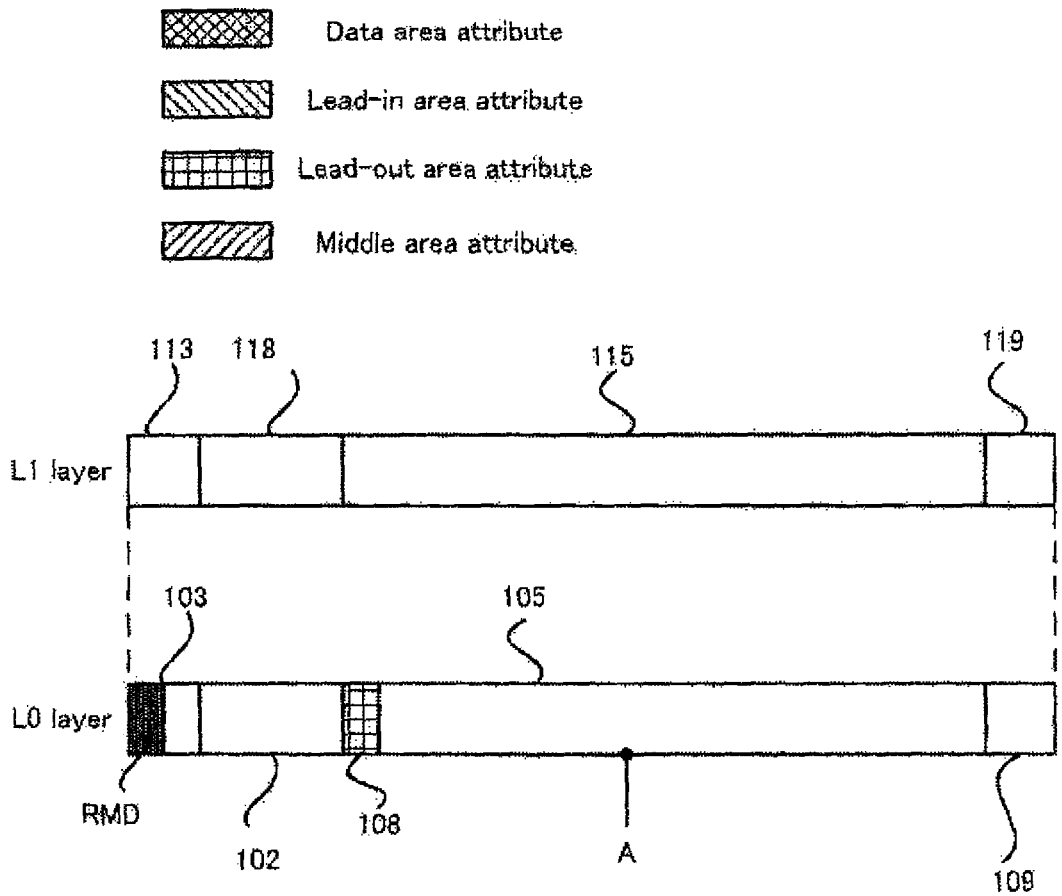
FIG. 13 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 13(*a*) and FIG. 13(*b*), a start sector number 121 of the shifted middle area is set, which is formed after this time's recording of the user data. Specifically, for example, if the user data is recorded up to the point of an address "A" and the shifted middle area 106 is formed following the recorded user data, the start sector number 121 of the shifted middle area is set to "A+1". At this time, the shifted middle area 106 (116) is not actually formed on the optical disc 100. The start sector number 121 of the shifted middle area indicates the start sector number of the shifted middle area 106 which will be formed after the user data is recorded (namely, the logical or virtual shifted middle area 106).

Incidentally, the point where the layer jump is performed is set by the setting of the start sector number 121 of the shifted middle area. More specifically, if the start sector number 121 of the shifted middle area is set to "A+1", the layer jump is performed at the point whose address is "A".

Figures 14A, 14B:
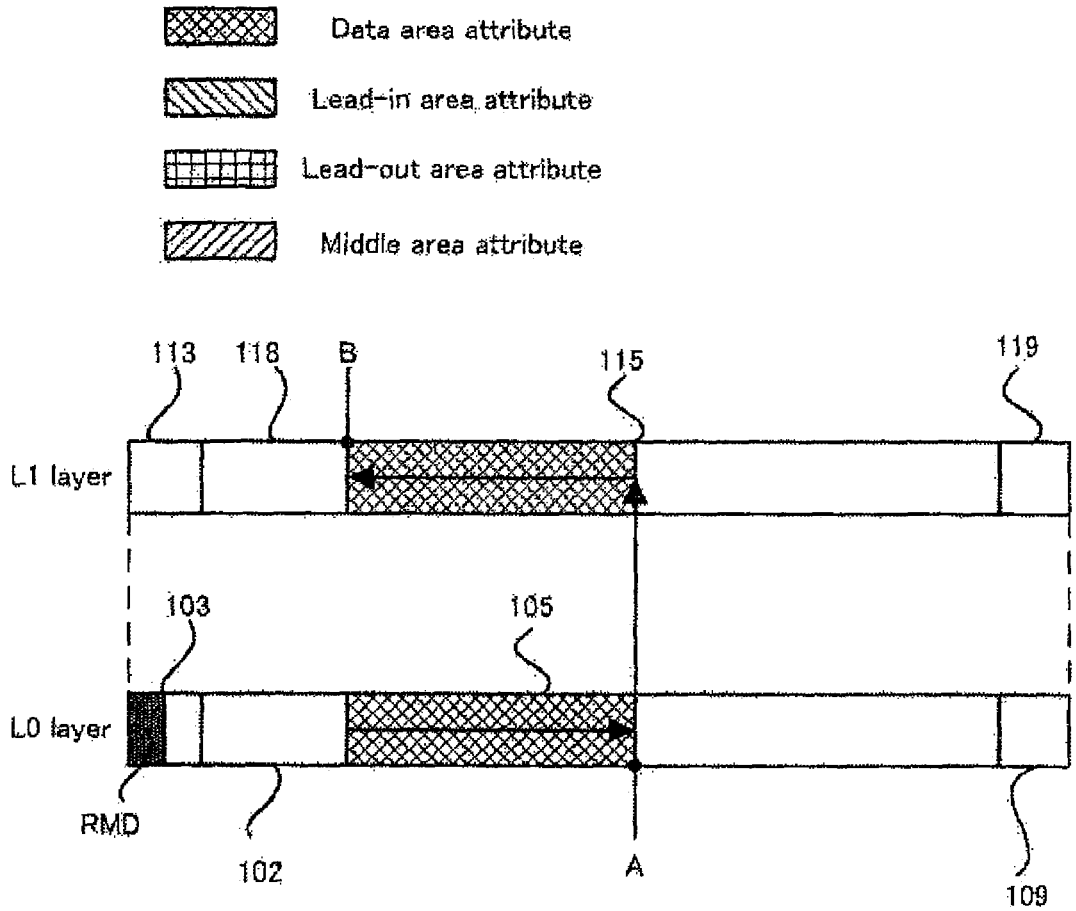
FIG. 14 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 14(*a*), the user data is recorded into the user data area 105 (115). Since the start sector number of the shifted middle area is set to "A+1", , the user data is recorded from the edge portion on the inner circumferential side of the user data area 105 toward the outer circumferential side, up to the point whose address is "A". Then, the layer jump is performed, and then, the user data is recorded toward the inner circumferential side of the user data area 115, up to a point whose address is Along with the recording of the user data, as shown in FIG. 14(*b*), a last recorded address 124 in the RMD is set to "B", and the end sector number of RZone is set to "B".

Figures 15A, 15B:
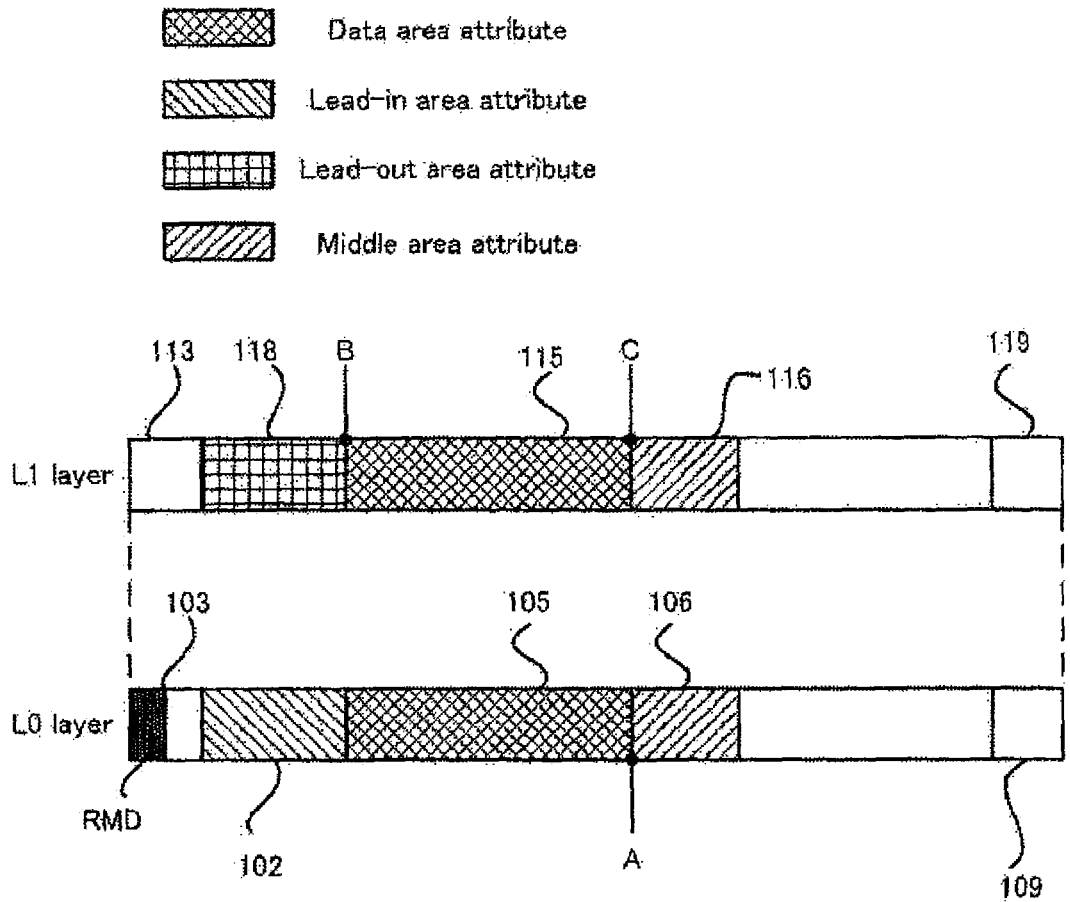
FIG. 15 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 15(*a*), a close process (in other words, a compatibility process) is performed to provide compatibility between a read-only type optical disc, such as a DVD-ROM, for example, and the optical disc 100 in the embodiment. Specifically, predetermined data (e.g. control data and padding data such as "00h", or the like) is recorded into the lead-in area 102, the lead-out area 118, and the shifted middle area.

Along with the close process, as shown in FIG. 15(*b*), the outermost address of the formatted area on the L0 layer is set to "A", and the outermost address of the innermost formatted area on the L1 layer is set to "C". Moreover, the shifted middle area 106 (116) is formed by physically recording the data with the middle area attribute added, so that the physical shifted middle area recorded flag is set to "1b". Moreover, along with the close process, the disc status (refer to FIG. 8) is set to "13h", indicating that the optical disc 100 is in the complete state.

Figures 16A, 16B:
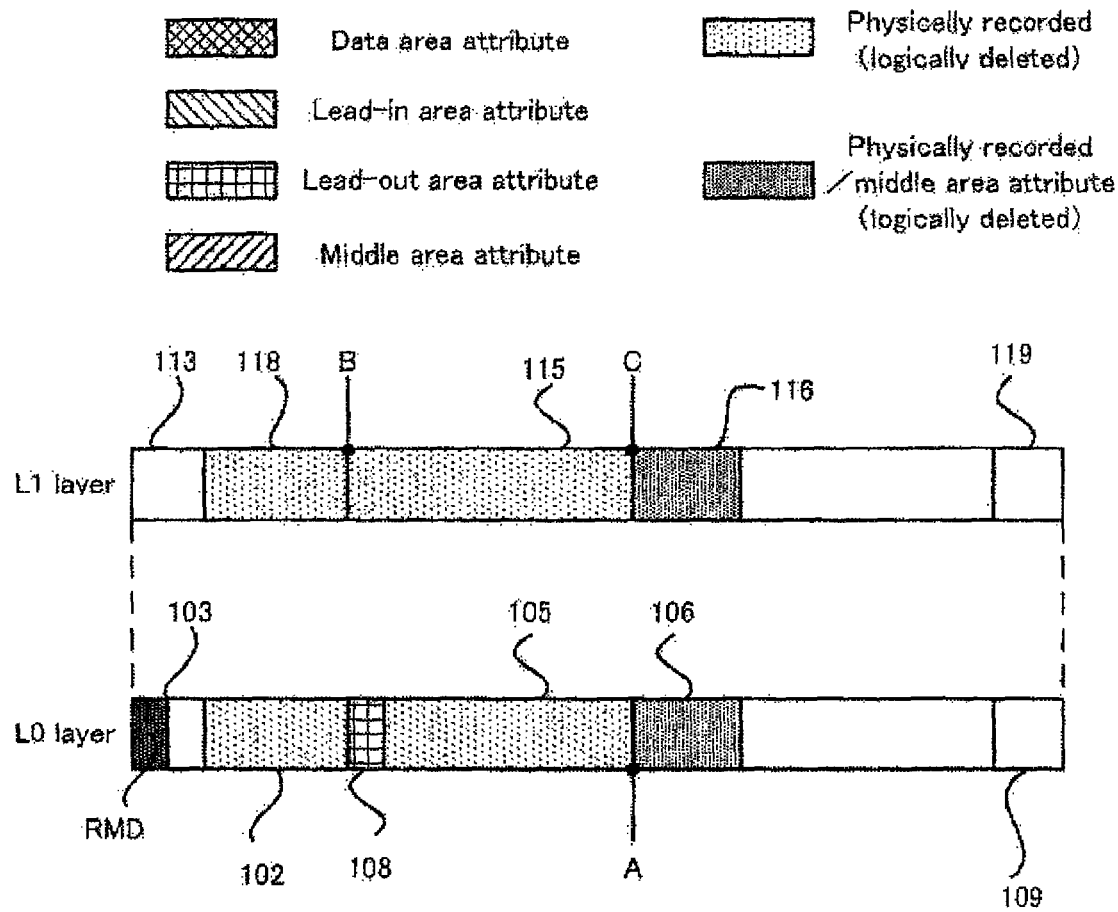
FIG. 16 are an explanatory diagram conceptually showing another procedure in which the user data is recorded by the operation of the information recording/reproducing appara- FIG. 17 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 16(a), the quick format process is performed. Specifically, a shown in FIG. 16(b), the start sector number 121 of the shifted middle area in the RMD is initialized to "00h", and the last recorded address 124 is initialized to "00h", and the end sector number 123 of RZone is initialized to "00h".

At this time, the data recorded on the optical disc 100 is logically deleted. However, the data recorded on the optical disc 100 physically exists on the optical disc 100 as it is. Thus, although it is logically deleted, the shifted middle area 106 (116) physically exists, so that the physical shifted middle area recorded flag 122 is kept "1b" and it is not updated. In the same manner, the outermost address 125 of the formatted area on the L0 layer and the outermost address 126 of the innermost formatted area on the L1 layer are also not updated, because the data physically exists although it is logically deleted.

Incidentally, the disc status (refer to FIG. 8) is set to "12h", indicating that the optical disc 100 is in the intermediate state.

Figures 17A, 17B:
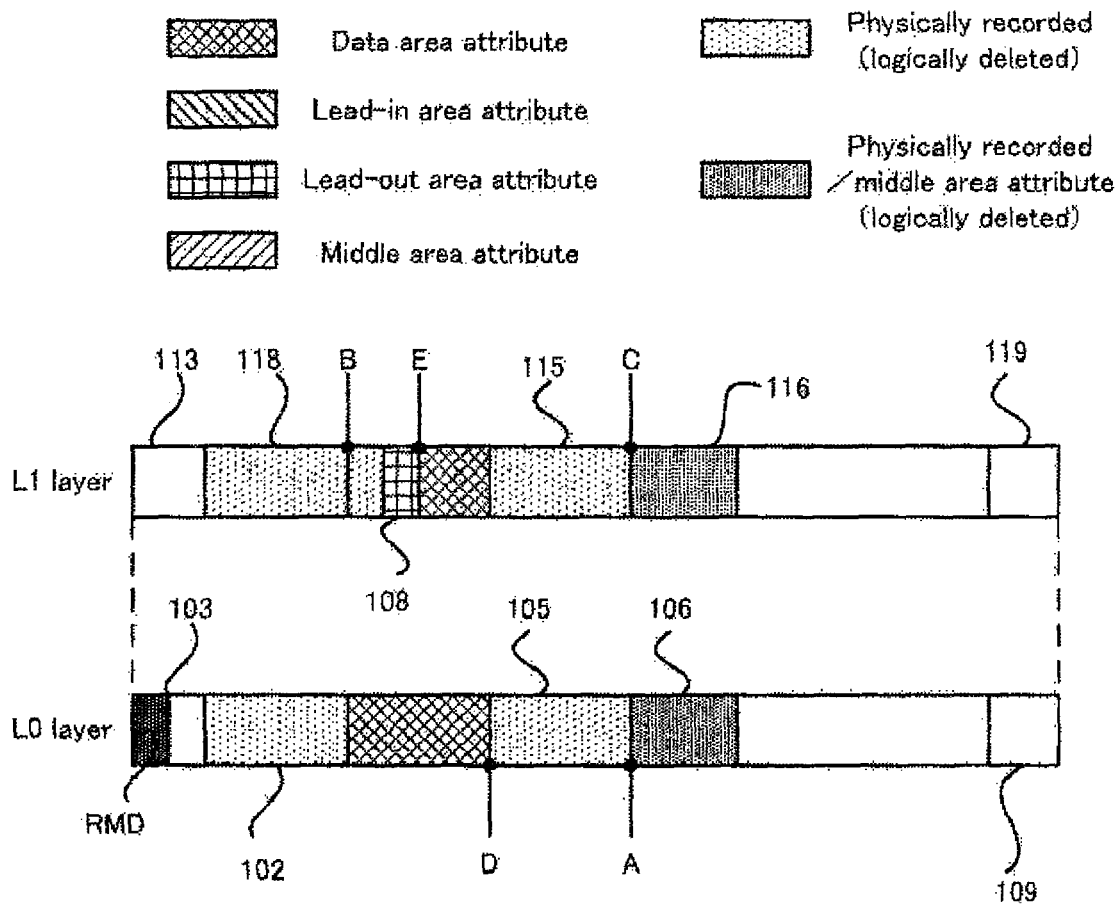

Then, as shown in FIG. 17(a), the start sector number 121 of the shifted middle area, which is formed after this time's recording of the user data, is set again. Specifically, as shown in FIG. 18(b), the start sector number 121 of the shifted middle area is set to "D+1".

Then, the user data is recorded into the user data area 105 (115). Since the start sector number of the shifted middle area is set to "D+1", the user data is recorded from the edge portion on the inner circumferential side of the user data area 105 toward the outer circumferential side, up to a point whose address is "D". Then, the layer jump is performed, and then, the user data is recorded toward the inner circumferential side of the user data area 115, up to a point whose address is "E".

Along with the recording of the user data, as shown in FIG. 17(b), the last recorded address 124 in the RMD is set to "E", and the end sector number of RZone is set to "E".

Figures 18A, 18B:
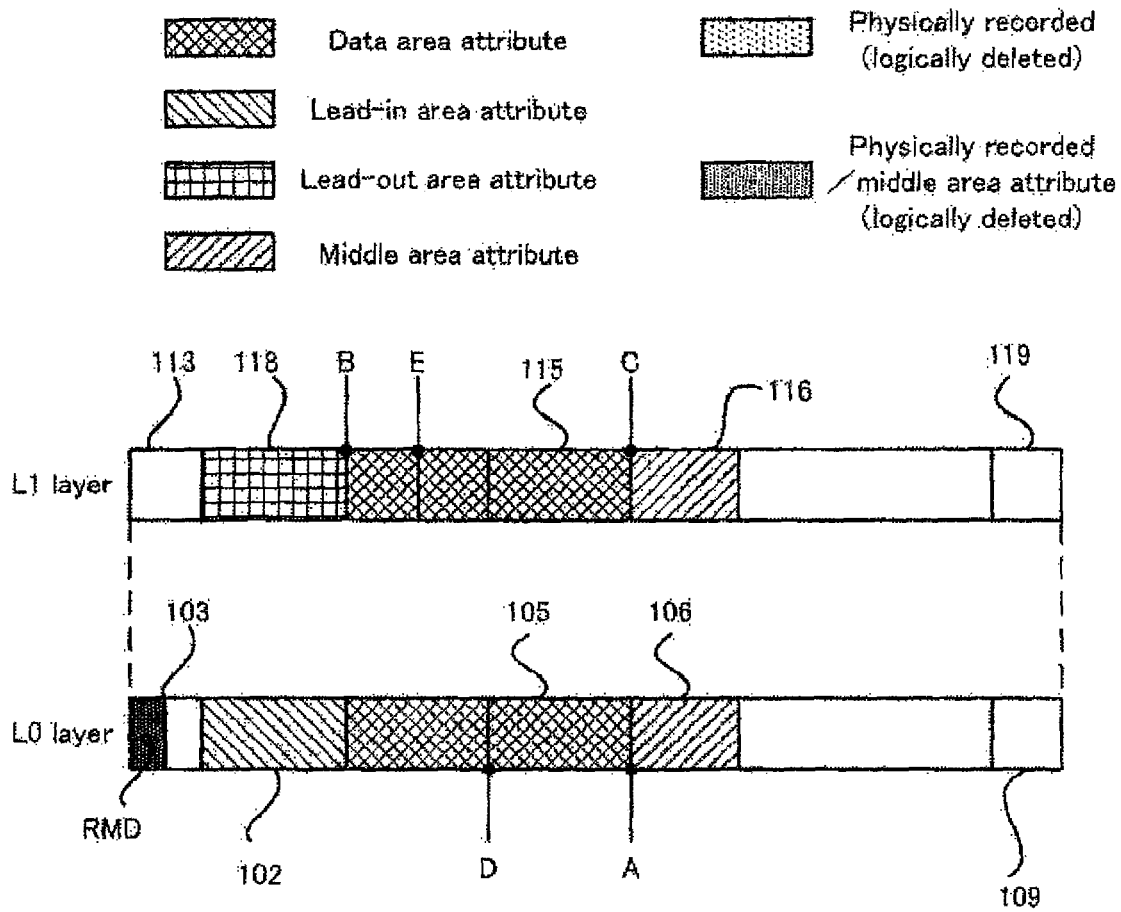
FIG. 18 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 18(a), the close process (in other words, the compatibility process) is performed. When the close process is performed, the physical shifted middle area recorded flag 122 is "1b", and the start sector number 121 of the shifted middle area is smaller than the outermost address 125 of the formatted area on the L0 layer. In other words, it is possible to recognize that the shifted middle area 106 which logically exists and whose position is indicated by the start sector number 121 of the shifted middle area is inner than the shifted middle area 106 which physically exists and whose position is indicated by the outermost address 125 of the formatted area on the L0 layer. By this, it is possible to recognize that the logically deleted shifted middle area 106 (116) physically remains on the optical disc 100 and that it is not even deleted by the recording of the user data. Thus, in the close process in such a case, without newly recording the data to which the middle area attribute is added, the disc status (refer to FIG. 8) is set to "13h", indicating that the optical disc 100 is in the complete state.

At this time, the logical recording state of the optical disc 100 is shown in FIG. 19. Namely, logically, the shifted middle area 106 (116) is formed to be adjacent to a point shown by an address "D" (in other words, a position shown by the start sector number 121 of the shifted middle area).

Figures 20A, 20B:
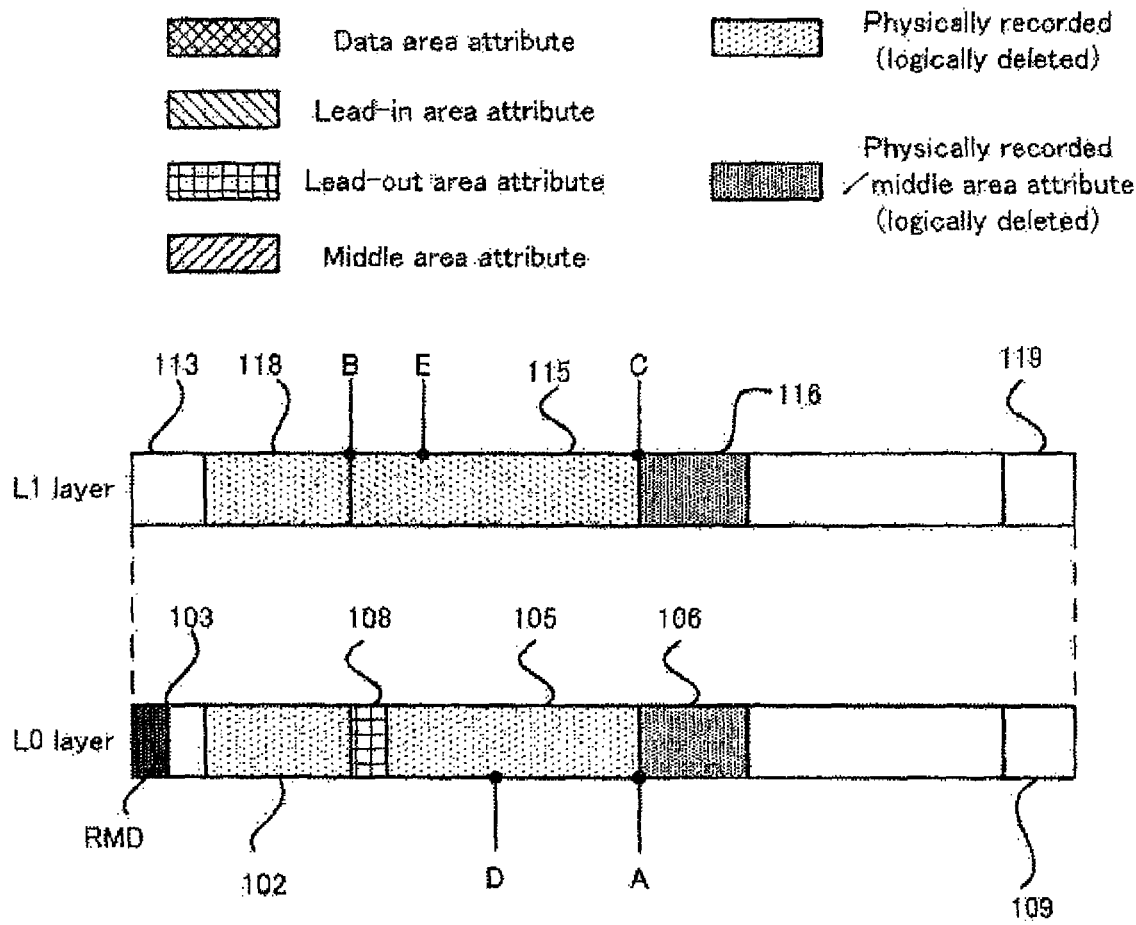
FIG. 20 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 20(a), the quick format process is performed. Specifically, as shown in FIG. 20(b), the start sector number 121 of the shifted middle area in the RMD is initialized to "00h", and the last recorded address 124 is initialized to "00h", and the end sector number 123 of RZone is initialized to "00h".

At this time, the data recorded on the optical disc 100 is logically deleted. However, the data recorded on the optical disc 100 physically exists on the optical disc 100 as it is. Thus, although it is logically deleted, the shifted middle area 106 (116) physically exists, so that the physical shifted middle area recorded flag 122 is kept "1b" and it is not updated. In the same manner, the outermost address 125 of the formatted area on the L0 layer and the outermost address 126 of the innermost formatted area on the L1 layer are also not updated, because the data physically exists although it is logically deleted.

Incidentally, the disc status (refer to FIG. 8) is set to "12h", indicating that the optical disc 100 is in the intermediate state.

Figures 21A, 21B:
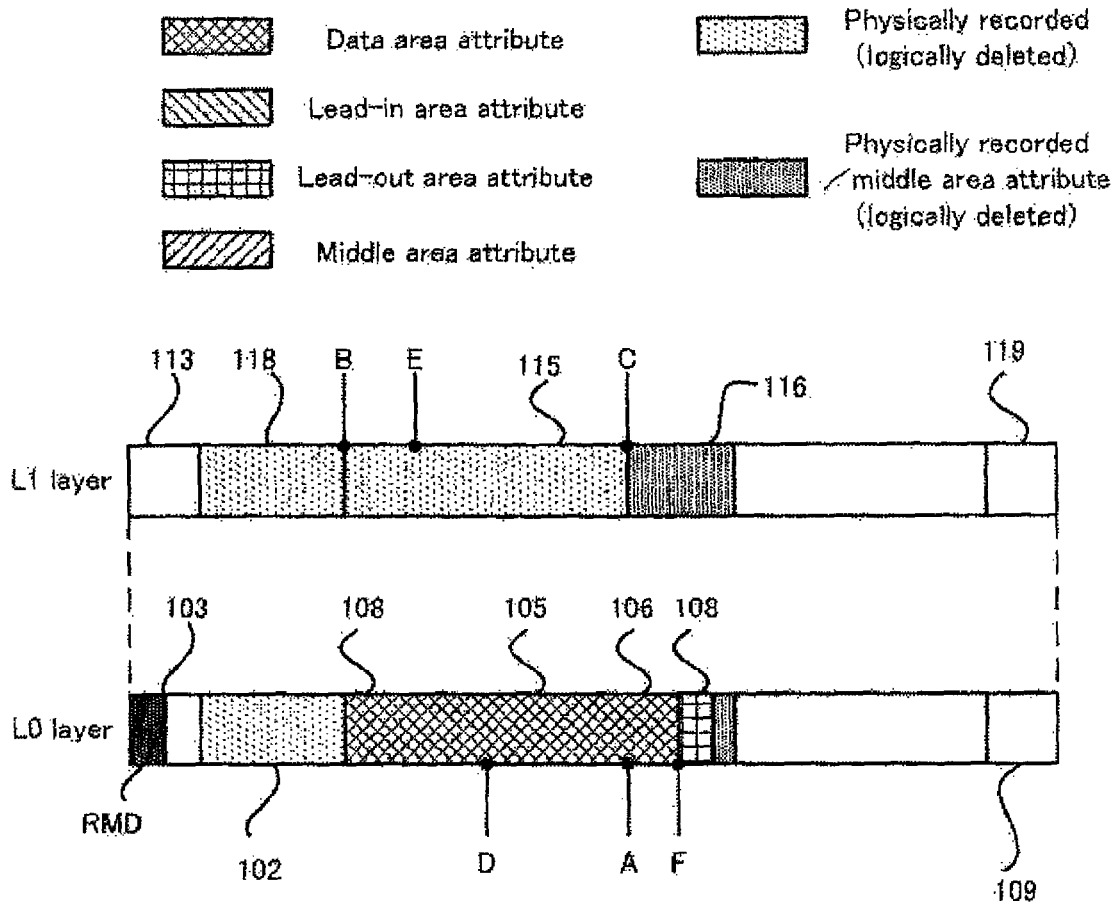
FIG. 21 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 21(a), the user data is recorded into the user data area 105 (115). Here, it is assumed that the user data is recorded up to a point whose address is shown by "F" (F>A) in the user data area 105. At this time, the user data is recorded over the address "A", so that the data with the middle area attribute is rewritten into the user data. Namely, the user data is overwritten on the physically formed shifted middle area 106. Thus, the shifted middle area 106 no longer exists on the optical disc 100. Then, as shown in FIG. 21(b), the physical shifted middle area recorded flag 122 is set to "0b".

In this case, it may be constructed such that the physical shifted middle area recorded flag 122 is set to "0b" if the start sector number 121 of the shifted middle area is greater than the outermost address 125 of the formatted area on the L0 layer (i.e. the shifted middle area 106 which logically exists is outer than the shifted middle area 106 which physically exists).

Moreover, along with the recording of the user data, as shown in FIG. 21(b), the last recorded address 124 in the RMD is set to "F", and the end sector number of RZone is set to "F".

Figures 22A, 22B:
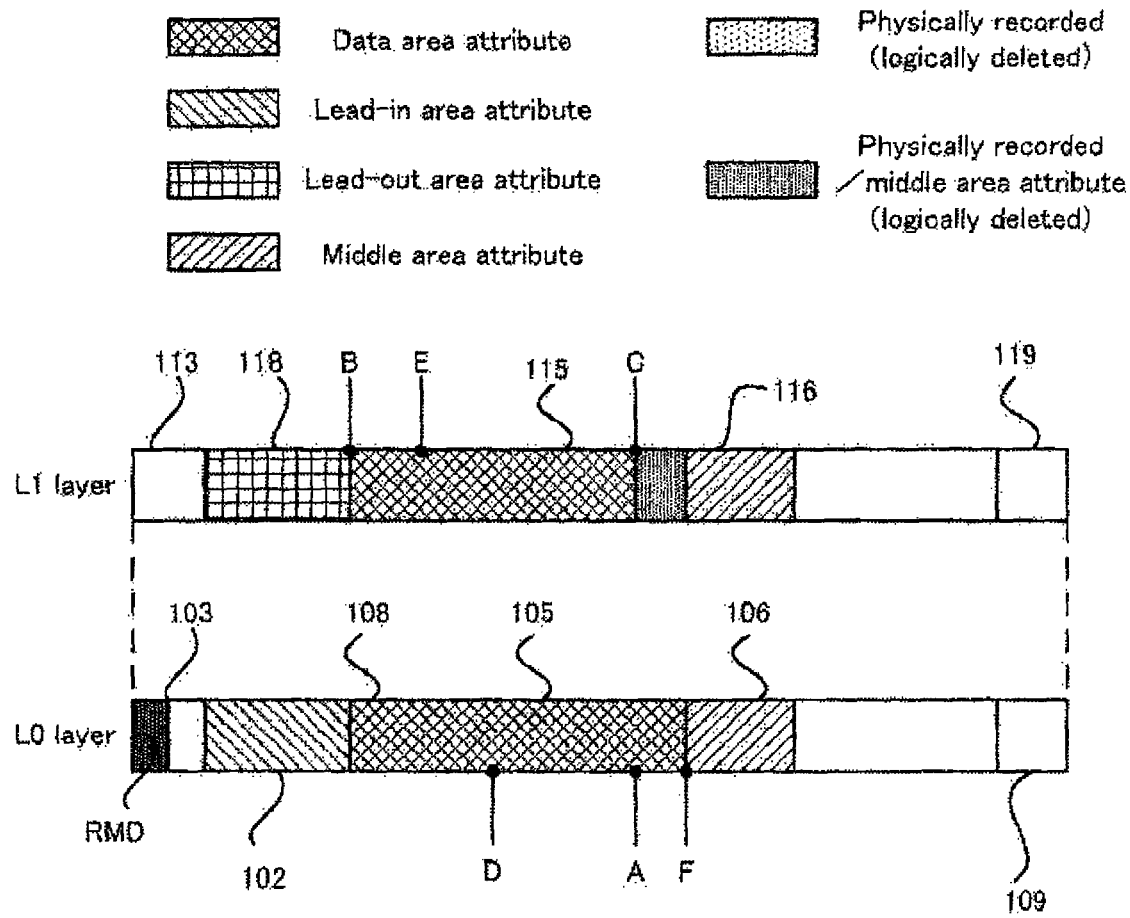
FIG. 22 are an explanatory diagram conceptually showing another procedure in which the user data is recorded by the operation of the information recording/reproducing apparatus in the embodiment in association with the area structure of the optical disc, and a table showing the specific value of RMD at that time.

Then, as shown in FIG. 22(a), the close process (in other words, the compatibility process) is performed. When the close process is performed, the physical shifted middle area recorded flag 122 is "0b", so that it is possible to recognize that there is no physical shifted middle area 106 on the optical disc 100 (in other words, there is no shifted middle area 106 formed by physically recording the data with the middle area attributed added). Thus, in the close process in such a case, after the data with the middle area attribute added is newly recorded from the position of an address "F+1", the disc status (refer to FIG. 8) is set to "13h", indicating that the optical disc 100 is in the complete state.

Along with the close process, as shown in FIG. 22(b), the outermost address of the formatted area on the L0 layer is set to "F". Moreover, since the shifted middle area 106 (116) is newly formed by physically recording the data with the middle area attribute added, the physical shifted middle area recorded flag is set to "1b".

As explained above, according to the embodiment, the position of the logically formed shifted middle area 106 (116) is indicated by the start sector number 121 of the shifted middle area. Moreover, the position of the physically formed shifted middle area 106 (116) is indicated by the physical shifted middle area recorded flag 122, the outermost address 125 of the formatted area on the L0 layer, and the outermost address 126 of the innermost formatted area on the L1 layer. Namely, it is possible to independently and separately manage the position of the logically formed shifted middle area 106 (116) and the position of the physically formed shifted middle area 106 (116). Thus, even if the shifted middle area 106 (116) which is once physically formed by the close process is logically deleted by the format process or the like, the information recording/reproducing apparatus 200 can preferably recognize the position of the shifted middle area 106 (116) that is physically not deleted but exists. Thus, even in the case where the shifted middle area 106 (116) is to be formed in a logically different position along with the recording of the user data, as long as the once formed shifted middle area 106 (116) is not physically deleted, it is possible to complete the close process by logically reactivating the shifted middle area 106 (116) which physically exists. On the other hand, in the case where the physically exiting shifted middle area 106 (116) is physically deleted along with the recording of the user data by a user, for example, it is possible to complete the close process by physically and newly recording the data to which the middle area attribute is added. As described above, according to the embodiment, it is possible to relatively reduce a time length required for the close process. In other words, it is possible to select whether or not to newly record the data with the middle area attribute added, as occasion demands. Thus, it is possible to efficiently form the shifted middle area 106 (116).

Incidentally, in the embodiment, it is constructed such that the start sector number 121 of the shifted middle area indicates the position of the logical shifted middle area 106 (116). Moreover, it is constructed such that the combination of the physical shifted middle area recorded flag 122, the outermost address 125 of the formatted area on the L0 layer, and the outermost address 126 of the innermost formatted area on the L1 layer indicates the position of the physical shifted middle area 106 (116). However, it may be constructed such that the start sector number of the physical shifted middle area and the start sector number of the logical shifted middle area are included, independently and separately. Alternatively, instead of the combination of the flag and the address, pointers may be included which directly indicate the respective positions of the physical shifted middle area 106 (116) and the logical shifted middle area 106 (116).

Moreover, as a specific example of the buffer area of the present invention, the shifted middle area 106 (116) was explained. However, it is also possible to receive the above-mentioned various benefits by applying the above-mentioned construction to the lead-in area 102, the lead-out area 118, the fixed middle area 109 (119), or a border-in area and a border-out area used in border recording, or the like.

Incidentally, in the above-mentioned embodiments, the optical disc 100 is explained as one example of the information recording medium, and the recorder related to the optical disc 100 is explained as one example of the information recording apparatus. The present invention, however, is not limited to the optical disc and the recorder thereof, and can be applied to other various information recording media which support high-density recording or a high transfer rate, and recorders thereof.

The present invention is not limited to the aforementioned embodiment, but various changes may be made, if desired, without departing from the essence or spirit of the invention which can be read from the claims and the entire specification. An information recording medium, an information recording apparatus and method, and a computer program, all of which involve such changes, are also intended to be within the technical scope of the present invention.

INDUSTRIAL APPLICABILITY

The information recording medium, the information recording apparatus and method, and the computer program according to the present invention can be applied to an information recording medium, such as a DVD, and further to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording medium which is for rewriting data thereon, comprising a recording management area in which recording management data for managing recording of the data on the information recording medium is recorded,
the recording management data including: (i) physical position information indicating a position of a physical buffer area in which buffer data for buffering a recording operation is physically recorded as the data and (ii) logical position information indicating a position of a logical buffer area in which the buffer data is logically recorded or to be recorded as the data.

2. The information recording medium according to claim 1, wherein the physical position information includes a flag indicating whether or not the physical buffer area is formed on the information recording medium.

3. The information recording medium according to claim 1, wherein the physical position information includes an address of an edge portion on an outermost circumferential side of a recording area, the recording area being a continuous recording area to which a data area attribute, indicating that user data is physically recorded as the data, is added out of a plurality of types of attributes, and being closest to an edge portion on an innermost circumferential side of the information recording medium.

4. The information recording medium according to claim 1, wherein the logical position information includes an address of an edge portion on an innermost circumferential side of the logical buffer area.

5. The information recording medium according to claim 1, wherein the logical position information includes an address of an edge portion on an outermost circumferential side of a recording area, the recording area being logically efficient and to which a data area attribute, indicating that user data is physically recorded as the data, is added out of a plurality of types of attributes.

6. The information recording medium according to claim 1, comprising a first recording layer and a second recording layer, each of which is for rewriting data thereon.

7. The information recording medium according to claim 6, wherein the physical position information includes each of (i) an address of an edge portion on an outermost circumferential side of a recording area, the recording area being a continuous recording area to which a data area attribute, indicating that user data is physically recorded as the data, is added out of a plurality of types of attributes, and being closest to an edge portion on an innermost circumferential side of the first recording layer, and (ii) an address of an edge portion on an outermost circumferential side of a recording area, the recording area being a continuous recording area to which the data attribute is added and being closest to an edge portion on an innermost circumferential side of the second recording layer.

8. An information recording apparatus comprising:
a recording device for recording data onto an information recording medium which is for rewriting data thereon; and
a controlling device for controlling said recording device to record, as the data, recording management data for managing recording of the data on the information recording medium, the recording management data including: (i) physical position information indicating a position of a physical buffer area in which buffer data for buffering a recording operation is physically recorded as the data and (ii) logical position information indicating a position of a logical buffer area in which the buffer data is logically recorded or to be recorded as the data.

9. The information recording apparatus according to claim 8, wherein the physical position information includes a flag indicating whether or not the physical buffer area is formed on the information recording medium.

10. The information recording apparatus according to claim 8, wherein the physical position information includes an address of an edge portion on an outermost circumferential side of a recording area, the recording area being a continuous recording area to which a data area attribute, indicating that user data is physically recorded as the data, is added out of a plurality of types of attributes, and being closest to an edge portion on an innermost circumferential side of the information recording medium.

11. The information recording apparatus according to claim 8, wherein the logical position information includes an address of an edge portion on an innermost circumferential side of the logical buffer area.

12. The information recording apparatus according to claim 8, wherein the logical position information includes an address of an edge portion on an outermost circumferential side of a recording area, the recording area being logically efficient and to which a data area attribute, indicating that user data is physically recorded as the data, is added out of a plurality of types of attributes.

13. The information recording apparatus according to claim 8, wherein the information recording medium comprises a first recording layer and a second recording layer, each of which is for rewriting data thereon.

14. The information recording apparatus according to claim 13, wherein the physical position information includes each of (i) an address of an edge portion on an outermost circumferential side of a recording area, the recording area being a continuous recording area to which a data area attribute, indicating that user data is physically recorded as the data, is added out of a plurality of types of attributes, and being closest to an edge portion on an innermost circumferential side of the first recording layer, and (ii) an address of an edge portion on an outermost circumferential side of a recording area, is the recording area being a continuous recording area to which the data attribute is added and being closest to an edge portion on an innermost circumferential side of the second recording layer.

15. The information recording apparatus according to claim 8, comprising:

a compatibility device for performing a compatibility process to provide compatibility with a read-only information recording medium; and a judging device for judging a positional relationship between the physical buffer area and the logical buffer area, said compatibility device setting a disc status for indicating a compatibility state of the information recording medium to compatibility-already-processed status, if it is judged by said judging device that the physical buffer area is in a same position of or outer than the logical buffer area, said compatibility device recording the buffer data into the logical buffer area indicated by the logical position information and setting the disc status to compatibility-already-processed status, if it is judged by said judging device that the physical buffer area is inner than the logical buffer area.

16. An information recording method comprising:

a first recording process of recording data onto an information recording medium which is for rewriting data thereon; and a second recording process of recording, as the data, recording management data for managing recording of the data on the information recording medium, the recording management data including: (i) physical position information indicating a position of a physical buffer area in which buffer data for buffering a recording operation is physically recorded as the data and (ii) logical position information indicating a position of a logical buffer area in which the buffer data is logically recorded or to be recorded as the data.

* * * * *